United States Patent
Li et al.

(10) Patent No.: US 10,701,390 B2
(45) Date of Patent: Jun. 30, 2020

(54) AFFINE MOTION INFORMATION DERIVATION

(71) Applicant: QUALCOMM Incorporated, San Diego, CA (US)

(72) Inventors: Xiang Li, San Diego, CA (US); Yi-Wen Chen, San Diego, CA (US); Jianle Chen, San Diego, CA (US); Hsiao-Chiang Chuang, San Diego, CA (US); Wei-Jung Chien, San Diego, CA (US); Yu-Chen Sun, Bellevue, WA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/918,789

(22) Filed: Mar. 12, 2018

(65) Prior Publication Data

US 2018/0270500 A1 Sep. 20, 2018

Related U.S. Application Data

(60) Provisional application No. 62/471,099, filed on Mar. 14, 2017.

(51) Int. Cl.
*H04N 19/00* (2014.01)
*H04N 19/52* (2014.01)
(Continued)

(52) U.S. Cl.
CPC ......... *H04N 19/52* (2014.11); *H04N 19/176* (2014.11); *H04N 19/44* (2014.11); *H04N 19/54* (2014.11)

(58) Field of Classification Search
CPC ........... H04N 11/00; H04N 19/00; H04N 7/00
See application file for complete search history.

(56) References Cited

U.S. PATENT DOCUMENTS 8,934,054 B2   1/2015   Ohno
9,438,910 B1 *  9/2016   Han .................... H04N 19/105
(Continued)

OTHER PUBLICATIONS

Huawei Technologies: "Affine Transform Prediction for Next Generation Video Coding," ITU-T SG16 Meeting; Oct. 12-23, 2015; Geneva, No. T13-SG16-C-1016, Sep. 29, 2015, XP030100743, 11 pages.

(Continued)

*Primary Examiner* — Maryam A Nasri
(74) *Attorney, Agent, or Firm* — Polsinelli LLP

(57) ABSTRACT

Techniques and systems are provided for deriving one or more sets of affine motion parameters at a decoder. For example, the decoder can obtain video data from an encoded video bitstream. The video data includes at least a current picture and a reference picture. The decoder can determine a set of affine motion parameters for a current block of the current picture. The set of affine motion parameters can be used for performing motion compensation prediction for the current block. The set of affine motion parameters can be determined using a current affine template of the current block and a reference affine template of the reference picture. In some cases, an encoder can determine a set of affine motion parameters for a current block using a current affine template of the current block and a reference affine template of the reference picture, and can generate an encoded video bitstream that includes a syntax item indicating template matching based affine motion derivation mode is to be used by a decoder for the current block. The encoded video bitstream may not include any affine motion parameters for determining the set of affine motion parameters.

48 Claims, 20 Drawing Sheets

(51) Int. Cl.
*H04N 19/44* (2014.01)
*H04N 19/176* (2014.01)
*H04N 19/54* (2014.01)

(56) References Cited

U.S. PATENT DOCUMENTS

| | | | |
|---|---|---|---|
| 10,187,657 | B2 | 1/2019 | Park et al. |
| 2004/0252759 | A1 | 12/2004 | John Winder et al. |
| 2006/0215037 | A1 | 9/2006 | Tsunekawa et al. |
| 2007/0229533 | A1 | 10/2007 | Dalal et al. |
| 2009/0059068 | A1 | 3/2009 | Hanaoka et al. |
| 2009/0122188 | A1 | 5/2009 | Hanaoka et al. |
| 2010/0002133 | A1 | 1/2010 | Ueno et al. |
| 2010/0039557 | A1 | 2/2010 | Mori et al. |
| 2010/0226435 | A1 | 9/2010 | Riemens et al. |
| 2010/0246675 | A1 | 9/2010 | Gharavi-Alkhansari et al. |
| 2010/0289944 | A1 | 11/2010 | Chen et al. |
| 2010/0290530 | A1* | 11/2010 | Huang ............... H04N 19/139 375/240.16 |
| 2010/0315548 | A1 | 12/2010 | Suen et al. |
| 2011/0294544 | A1 | 12/2011 | Liang et al. |
| 2012/0106645 | A1* | 5/2012 | Lin ................. H04N 19/577 375/240.16 |
| 2012/0147263 | A1 | 6/2012 | Chen et al. |
| 2013/0136185 | A1 | 5/2013 | Tian et al. |
| 2014/0198988 | A1 | 7/2014 | Ihara et al. |
| 2015/0023422 | A1 | 1/2015 | Zhang et al. |
| 2015/0245043 | A1 | 8/2015 | Greenebaum et al. |
| 2015/0271524 | A1 | 9/2015 | Zhang et al. |
| 2016/0358584 | A1 | 12/2016 | Greenebaum et al. |
| 2017/0188041 | A1* | 6/2017 | Li ........................ H04N 19/513 |
| 2017/0332095 | A1 | 11/2017 | Zou et al. |
| 2018/0098062 | A1 | 4/2018 | Li et al. |
| 2018/0098087 | A1 | 4/2018 | Li et al. |
| 2018/0192047 | A1 | 7/2018 | Lv et al. |

OTHER PUBLICATIONS

International Search Report and Written Opinion—PCT/US2018/022129—ISA/EPO—dated Jun. 19, 2018.

Kamp M-S., "Decoder-Side Motion Vector Derivation for Hybrid Video Coding Zur Erlangung Des Akademischen Grades Eines Doktors Der Ingenieurwissenschaften Genehmigte Dissertation", RWTH Aachen Series on Multimedia and Communications Engineering, Oct. 11, 2011, XP055361986, ISBN: 978-3-8440-0615-5, Retrieved from the Internet: URL:http://www.ient.rwth-aachen.de/services/bib2web/pdf/Ka11.pdf [retrieved on Apr. 5, 2017], 201 pages.

Li L., et al., "An Efficient Four-Parameter Mine Motion Model for Video Coding," Cornell University Library, 201 Olin Library Cornell University Ithaca, NY 14853, Feb. 21, 2017, XP080747890, 14 pages.

Chen J., et al., "Algorithm description of Joint Exploration Test Model 3 (JEM3)", 3, JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry.fr/jvet/,, No. JVET-C1001, Jul. 2, 2016 (Jul. 2, 2016), XP030150223, 38 Pages.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015, 4 Pages, XP030003883.

Narroschke M., et al., "Extending HEVC by an Affine Motion Model", 2013 Picture Coding Symposium (PSC), IEEE, Dec. 8, 2013, pp. 321-324, XP032566989, DOI:10.1109/PCS.2013.6737748 [retrieved on Feb. 11, 2014], 4 pages.

Qualcomm: "Harmonization and Improvement for Bio", ITU-T SG16 Meeting; Oct. 12, 2015-Oct. 23, 2015; Geneva, No. T13-SG 16-C-1045, Sep. 30, 2015 (Sep. 30, 2015), 3 Pages, XP030100753.

Rapporteur Q6/16: "Report of Question 6/16 "Visual coding"", ITU-T SG16 Meeting; Oct. 12, 2015-Oct. 23, 2015; Geneva,, No. T13-SG16-151012-TD-WP3-0215R1, Oct. 22, 2015, XP030100764, 24 pages.

Wiegand T., et al., "Description of Core Experiment on Affine Motion Compensation", 9th VCEG Meeting; Red Bank, New Jersey, US; (Video Coding Experts Group of ITU-T SG.16) No. q15i42, Oct. 13, 1999, XP030003012, 13 pages.

* cited by examiner

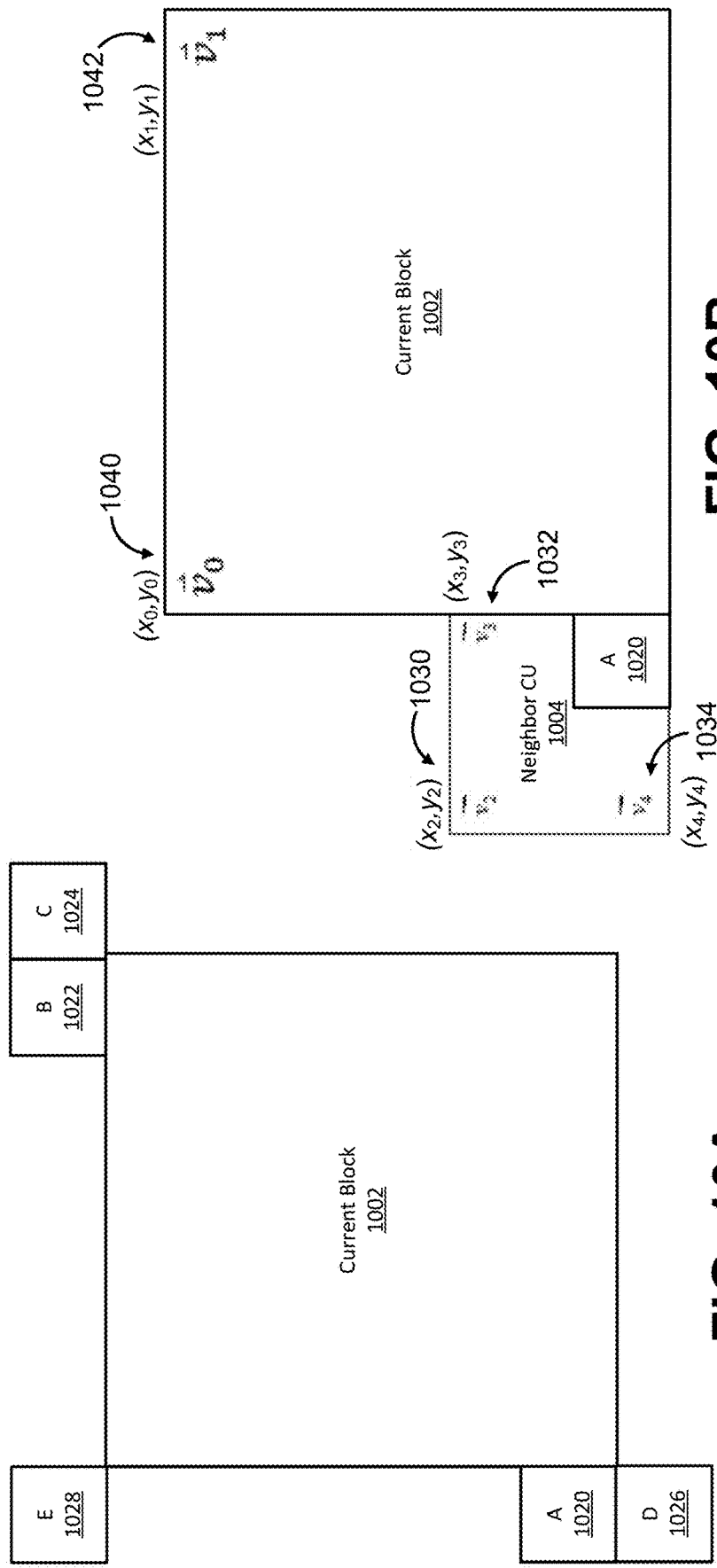

1400

> OBTAIN, BY A DECODER, VIDEO DATA FROM AN ENCODED VIDEO BITSTREAM, THE VIDEO DATA INCLUDING AT LEAST A CURRENT PICTURE AND A REFERENCE PICTURE
> 1402

> DETERMINE, BY THE DECODER, A SET OF AFFINE MOTION PARAMETERS FOR A CURRENT BLOCK OF THE CURRENT PICTURE, THE SET OF AFFINE MOTION PARAMETERS BEING USED FOR PERFORMING MOTION COMPENSATION PREDICTION FOR THE CURRENT BLOCK, WHEREIN THE SET OF AFFINE MOTION PARAMETERS ARE DETERMINED USING A CURRENT AFFINE TEMPLATE OF THE CURRENT BLOCK AND A REFERENCE AFFINE TEMPLATE OF THE REFERENCE PICTURE
> 1404

OBTAIN VIDEO DATA, THE VIDEO DATA INCLUDING AT LEAST A CURRENT PICTURE AND A REFERENCE PICTURE
1502

DETERMINE A SET OF AFFINE MOTION PARAMETERS FOR A CURRENT BLOCK OF THE CURRENT PICTURE, THE SET OF AFFINE MOTION PARAMETERS BEING USED FOR PERFORMING MOTION COMPENSATION PREDICTION FOR THE CURRENT BLOCK, WHEREIN THE SET OF AFFINE MOTION PARAMETERS ARE DETERMINED USING A CURRENT AFFINE TEMPLATE OF THE CURRENT BLOCK AND A REFERENCE AFFINE TEMPLATE OF THE REFERENCE PICTURE
1504

GENERATE AN ENCODED VIDEO BITSTREAM, THE ENCODED VIDEO BITSTREAM INCLUDING A SYNTAX ITEM INDICATING TEMPLATE MATCHING BASED AFFINE MOTION DERIVATION MODE IS TO BE USED BY A DECODER FOR THE CURRENT BLOCK, WHEREIN THE ENCODED VIDEO BITSTREAM DOES NOT INCLUDE ANY AFFINE MOTION PARAMETERS FOR DETERMINING THE SET OF AFFINE MOTION PARAMETERS
1506

FIG. 15

AFFINE MOTION INFORMATION DERIVATION

CROSS-REFERENCES TO RELATED APPLICATIONS

This application claims the benefit of and priority to U.S. Provisional Application 62/471,099, filed on Mar. 14, 2017, which is incorporated by reference herein in its entirety and for all purposes.

FIELD

This application is related to video coding and compression. For example, systems and methods are described for affine motion derivation.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Techniques and systems are described herein for performing decoder-side affine motion derivation. Affine motion based prediction allows complex motions to be estimated, such as rotation, zooming, translation, or any combination thereof, among others. In some cases, using the techniques described herein, affine motion parameters can be determined by a video decoding device (also referred to as a decoder) for one or more blocks of video pictures without requiring affine motion information to be sent to the decoding device. For instance, no affine motion parameters (or the differences between affine motion parameters and the predictors of affine motion parameters) are signaled for such an affine motion derivation mode.

The decoder-side affine motion derivation for a current block can be based on the use of templates. For example, a current affine template including spatially neighboring samples of a current block can be used, along with a reference affine template of a reference picture, to determine affine motion parameters for the current block. For example, the affine motion parameters of control points of the current affine template can be derived by minimizing the error (or distortion) between the affine prediction (associated with the pixels in the reference affine template) and reconstructed pixels of the current affine template of the current block. The affine motion parameters define the affine motion vectors for the control points of the current affine template. The affine motion vectors of the control points can then be used to determine motion vectors for pixels or sub-blocks of the current block.

According to at least one example, a method of deriving one or more sets of affine motion parameters at a decoder is provided. The method comprises obtaining, by the decoder, video data from an encoded video bitstream. The video data includes at least a current picture and a reference picture. The method further comprises determining, by the decoder, a set of affine motion parameters for a current block of the current picture. The set of affine motion parameters are used for performing motion compensation prediction for the current block. The set of affine motion parameters are determined using a current affine template of the current block and a reference affine template of the reference picture.

In another example, a decoder for deriving one or more sets of affine motion parameters is provided that includes a memory configured to store video data of an encoded video bitstream and a processor. The processor is configured to and can obtain the video data of the encoded video bitstream. The video data includes at least a current picture and a reference picture. The processor is further configured to and can determine a set of affine motion parameters for a current block of the current picture. The set of affine motion parameters are used for performing motion compensation prediction for the current block. The set of affine motion parameters are determined using a current affine template of the current block and a reference affine template of the reference picture.

In another example of deriving one or more sets of affine motion parameters at a decoder, a non-transitory computer-readable medium is provided having stored thereon instructions that, when executed by one or more processors, cause the one or more processor to: obtaining, by the decoder, video data from an encoded video bitstream, the video data including at least a current picture and a reference picture; and determining, by the decoder, a set of affine motion parameters for a current block of the current picture, the set of affine motion parameters being used for performing motion compensation prediction for the current block, wherein the set of affine motion parameters are determined using a current affine template of the current block and a reference affine template of the reference picture.

In another example, a decoder for deriving one or more sets of affine motion parameters is provided. The decoder includes means for obtaining video data from an encoded video bitstream. The video data includes at least a current picture and a reference picture. The decoder further includes means for determining a set of affine motion parameters for a current block of the current picture. The set of affine motion parameters are used for performing motion compensation prediction for the current block. The set of affine motion parameters are determined using a current affine template of the current block and a reference affine template of the reference picture.

In some aspects, the method, decoders, and computer-readable medium described above for deriving one or more sets of affine motion parameters at a decoder may further comprise: determining motion vectors for a plurality of sub-blocks of the current block using the set of affine motion parameters determined for the current block.

In some aspects, the method, decoders, and computer-readable medium described above for deriving one or more sets of affine motion parameters at a decoder may further comprise: determining motion vectors for a plurality of pixels of the current block using the set of affine motion parameters determined for the current block.

In some aspects, determining the set of affine motion parameters for the current block includes: obtaining, by the decoder, an initial set of affine motion parameters; deriving, by the decoder, one or more affine motion vectors for one or more pixels in the current affine template of the current block using the initial set of affine motion parameters, the current affine template of the current block including reconstructed pixels neighboring the current block; determining, by the decoder, one or more pixels in the reference affine template of the reference picture using the one or more affine motion vectors derived for the one or more pixels in the current affine template; minimizing, by the decoder, an error between at least the one or more pixels in the current affine template and the one or more pixels in the reference affine template determined using the one or more affine motion vectors; and determining, by the decoder, the set of affine motion parameters for one or more control points of the current affine template based on the minimized error between at least the one or more pixels in the current affine template and the one or more pixels in the reference affine template.

In some aspects, determining the set of affine motion parameters for the one or more control points of the current affine template includes: determining a plurality of sets of affine motion parameters for the one or more control points of the current affine template using at least the one or more pixels in the current affine template and the one or more pixels in the reference affine template determined using the one or more affine motion vectors; determining a quality metric for each set of affine motion parameters from the plurality of sets of affine motion parameters; and selecting, for the one or more control points of the current affine template, the set of affine motion parameters from the plurality of sets of affine motion parameters that has a lowest metric from among the plurality of sets of affine motion parameters. In some examples, the quality metric includes a sum of absolute differences (SAD).

In some aspects, the initial set of affine motion parameters are determined based on a translational motion vector determined for the current block. In some cases, the translational motion vector is determined using frame-rate-up-conversion (FRUC) template matching.

In some aspects, the initial set of affine motion parameters are determined based on an affine motion vector from a neighboring block of the current block.

In some aspects, no affine motion parameters are decoded from the encoded video bitstream for determining the set of affine motion parameters.

In some aspects, the current affine template of the current block includes one or more spatially neighboring samples of the current block. In some cases, the spatially neighboring samples include samples from one or more of a top neighboring block or a left neighboring block.

In some aspects, the current affine template includes an L-shaped block. The L-shaped block includes samples from a top neighboring block of the current block and samples from a left neighboring block of the current block.

In some cases, the decoder is part of a mobile device with a display for displaying decoded video data. In some cases, the decoder is part of a mobile device with a camera for capturing pictures.

According to at least one other example, a method of encoding video data is provided. The method comprises obtaining video data. The video data includes at least a current picture and a reference picture. The method further comprises determining a set of affine motion parameters for a current block of the current picture. The set of affine motion parameters are used for performing motion compensation prediction for the current block. The set of affine motion parameters are determined using a current affine template of the current block and a reference affine template of the reference picture. The method further comprises generating an encoded video bitstream. The encoded video bitstream includes a syntax item indicating template matching based affine motion derivation mode is to be used by a decoder for the current block. The encoded video bitstream does not include any affine motion parameters for determining the set of affine motion parameters.

In another example, an encoder for encoding video data is provided that includes a memory configured to store video data and a processor. The processor is configured to and can obtain the video data. The video data includes at least a current picture and a reference picture. The processor is further configured to and can determine a set of affine motion parameters for a current block of the current picture. The set of affine motion parameters are used for performing motion compensation prediction for the current block. The set of affine motion parameters are determined using a current affine template of the current block and a reference affine template of the reference picture. The processor is further configured to and can generate an encoded video bitstream, the encoded video bitstream including a syntax item indicating template matching based affine motion derivation mode is to be used by a decoder for the current block, wherein the encoded video bitstream does not include any affine motion parameters for determining the set of affine motion parameters.

In another example of encoding video data, a non-transitory computer-readable medium is provided having stored thereon instructions that, when executed by one or more processors, cause the one or more processor to: obtain the video data, the video data including at least a current picture and a reference picture; determine a set of affine motion parameters for a current block of the current picture, the set of affine motion parameters being used for performing motion compensation prediction for the current block, wherein the set of affine motion parameters are determined using a current affine template of the current block and a reference affine template of the reference picture; and generate an encoded video bitstream, the encoded video bitstream including a syntax item indicating template matching based affine motion derivation mode is to be used by a decoder for the current block, wherein the encoded video bitstream does not include any affine motion parameters for determining the set of affine motion parameters.

In another example, an encoder for encoding video data is provided. The encoder includes means for obtaining video data. The video data includes at least a current picture and a reference picture. The encoder further includes means for determining a set of affine motion parameters for a current block of the current picture. The set of affine motion parameters are used for performing motion compensation prediction for the current block. The set of affine motion parameters are determined using a current affine template of the current block and a reference affine template of the reference picture. The encoder further includes means for generating an encoded video bitstream. The encoded video bitstream includes a syntax item indicating template matching based affine motion derivation mode is to be used by a decoder for the current block. The encoded video bitstream does not include any affine motion parameters for determining the set of affine motion parameters.

In some aspects, the method, encoders, and computer-readable medium described above for encoding video data may further comprise: determining motion vectors for a plurality of sub-blocks of the current block using the set of affine motion parameters determined for the current block.

In some aspects, the method, encoders, and computer-readable medium described above for encoding video data may further comprise: determining motion vectors for a plurality of pixels of the current block using the set of affine motion parameters determined for the current block.

In some aspects, determining the set of affine motion parameters for the current block includes: obtaining an initial set of affine motion parameters; deriving one or more affine motion vectors for one or more pixels in the current affine template of the current block using the initial set of affine motion parameters, the current affine template of the current block including reconstructed pixels neighboring the current block; determining one or more pixels in the reference affine template of the reference picture using the one or more affine motion vectors derived for the one or more pixels in the current affine template; minimizing an error between at least the one or more pixels in the current affine template and the one or more pixels in the reference affine template determined using the one or more affine motion vectors; and determining the set of affine motion parameters for one or more control points of the current affine template based on the minimized error between at least the one or more pixels in the current affine template and the one or more pixels in the reference affine template.

In some aspects, determining the set of affine motion parameters for the one or more control points of the current affine template includes: determining a plurality of sets of affine motion parameters for the one or more control points of the current affine template using at least the one or more pixels in the current affine template and the one or more pixels in the reference affine template determined using the one or more affine motion vectors; determining a quality metric for each set of affine motion parameters from the plurality of sets of affine motion parameters; and selecting, for the one or more control points of the current affine template, the set of affine motion parameters from the plurality of sets of affine motion parameters that has a lowest metric from among the plurality of sets of affine motion parameters. In some examples, the quality metric includes a sum of absolute differences (SAD).

In some aspects, the initial set of affine motion parameters are determined based on a translational motion vector determined for the current block. In some cases, the translational motion vector is determined using frame-rate-up-conversion (FRUC) template matching.

In some aspects, the initial set of affine motion parameters are determined based on an affine motion vector from a neighboring block of the current block.

In some aspects, the current affine template of the current block includes one or more spatially neighboring samples of the current block. In some examples, the spatially neighboring samples include samples from one or more of a top neighboring block or a left neighboring block.

In some aspects, the current affine template includes an L-shaped block. The L-shaped block includes samples from a top neighboring block of the current block and samples from a left neighboring block of the current block.

In some aspects, the method, encoders, and computer-readable medium described above for encoding video data may further comprise: storing the encoded video bitstream. In some cases, the processor of the encoder or an apparatus comprising the encoder is configured to store the encoded video bitstream in the memory of the encoder or a memory of an apparatus comprising the encoder.

In some aspects, the method, encoders, and computer-readable medium described above for encoding video data may further comprise: transmitting the encoded video bitstream. In some cases, the encoder includes a transmitter configured to transmit the encoded video bitstream. In some cases, the encoder is part of a device with a transmitter configured to transmit the encoder.

In some aspects, the encoder is part of a mobile device with a display for displaying decoded video data. In some aspects, the encoder is part of a mobile device with a camera for capturing pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following drawing figures:

FIG. 10A and FIG. 10B are diagrams illustrating an example of motion vector prediction in affine merge (AF_MERGE) mode, in accordance with some examples;

FIG. 14 is a flow chart illustrating an example of a process for deriving one or more sets of affine motion parameters at a decoder, in accordance with some examples;

FIG. 15 is a flow chart illustrating an example of a process for encoding video data, in accordance with some examples;

DETAILED DESCRIPTION

Figure 1:
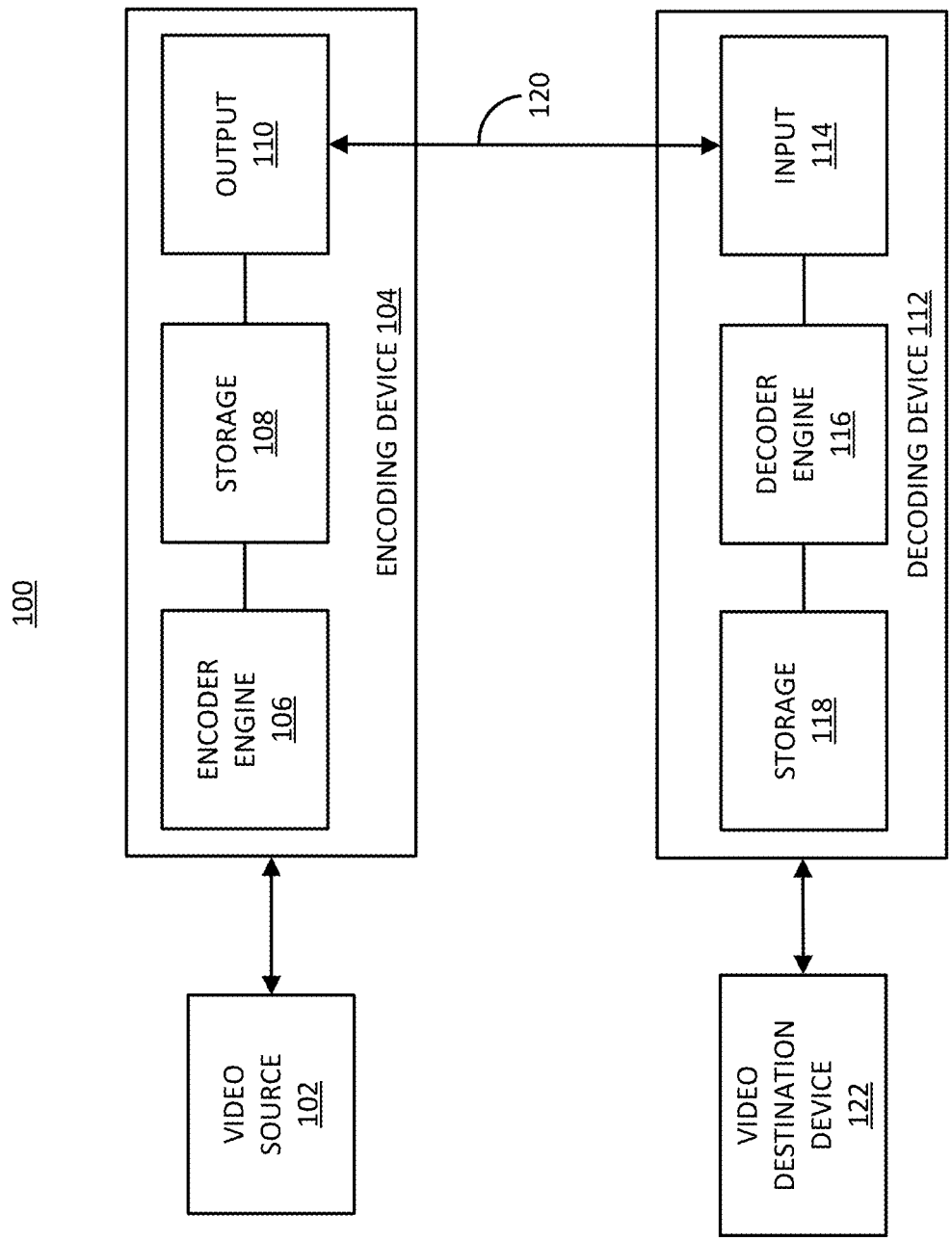
FIG. 1 is a block diagram illustrating an example of an encoding device and a decoding device, in accordance with some examples.

Certain aspects and implementations are provided below. Some of these aspects and implementations may be applied independently and some of them may be applied in combination as would be apparent to those of skill in the art. In the following description, for the purposes of explanation, specific details are set forth in order to provide a thorough understanding of various implementations. However, it will be apparent that various implementations may be practiced without these specific details. The figures and description are not intended to be restrictive.

The ensuing description provides example implementations only, and is not intended to limit the scope, applicability, or configuration of the disclosure. Rather, the ensuing description of the example implementations will provide those skilled in the art with an enabling description for implementing an example. It should be understood that various changes may be made in the function and arrangement of elements without departing from the spirit and scope of the application as set forth in the appended claims.

Specific details are given in the following description to provide a thorough understanding of different implementations. However, it will be understood by one of ordinary skill in the art that the implementations may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, various examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (WET) to explore new coding tools for the next generation of video coding standard. The reference software is called JEM (joint exploration model).

Many examples described herein provide examples using the JEM model, the HEVC standard, and/or extensions thereof. However, the techniques and systems described herein may also be applicable to other coding standards, such as AVC, MPEG, extensions thereof, or other suitable coding standards that currently exist or future coding standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some examples, an SEI message can be outside of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 16. An example of specific details of the decoding device 112 is described below with reference to FIG. 17.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

Figure 2:
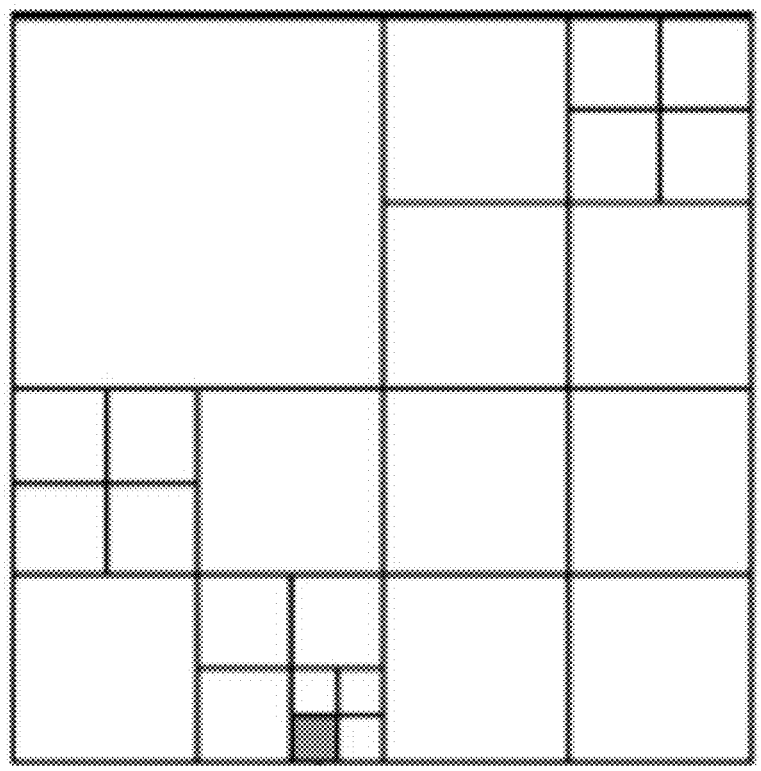
FIG. 2 is a diagram illustrating an example of a coding unit (CU) structure in HEVC, in accordance with some examples.

In HEVC, the largest coding unit in a slice is called a coding tree block (CTB). A CTB contains a quad-tree, the nodes of which are coding units. The size of a CTB can range from 16×16 pixels to 64×64 pixels in the HEVC main profile. In some cases, 8×8 pixel CTB sizes can be supported. A CTB may be recursively split into coding units (CU) in a quad-tree manner, as shown in FIG. 2. A CU could be the same size of a CTB and as small as 8×8 pixels. In some cases, each coding unit is coded with either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

Figure 3:
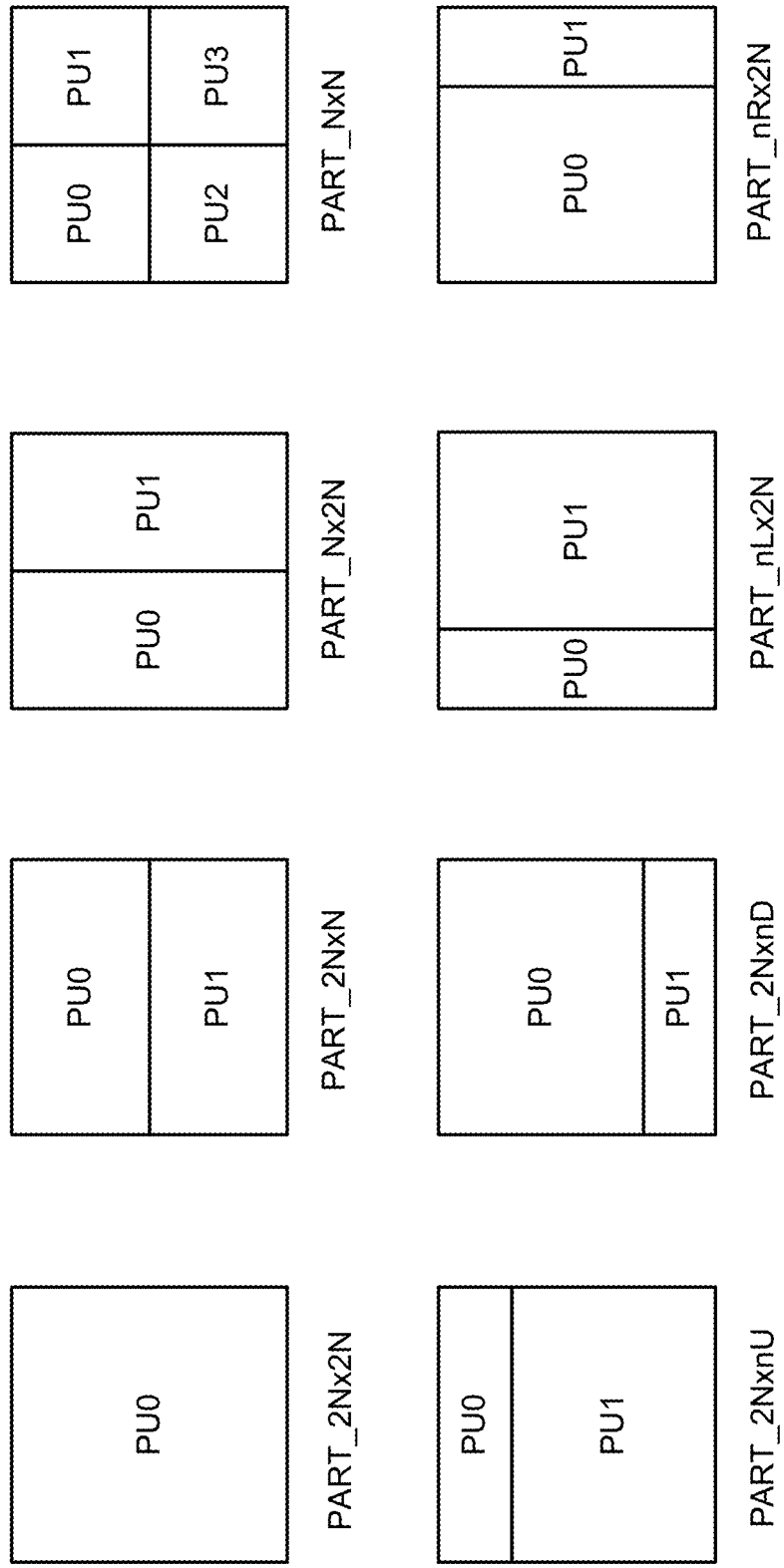
FIG. 3 is a diagram illustrating an example of partition modes for an inter-prediction mode, in accordance with some examples.

FIG. 3 is a diagram illustrating eight partition modes for a CU coded with inter-prediction mode. As shown, the partition modes include PART_2N×2N, PART_2N×N, PART_N×2N, PART_N×N, PART_2N×nU, PART_2N×nD, PART_nL×2N, and PART_nR×2N. A CU can be partitioned into PUs according to the different partition modes. Accordingly, a CU can be predicted using one or more of the partitioning modes.

When the CU is inter-coded, one set of motion information can be present for each PU. In addition, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there can be two inter-prediction modes for a CU or PU, including a merge mode and an advanced motion vector prediction (AMVP) mode. A skip mode is considered as a special case of the merge mode. In either AMVP or merge mode, a motion vector (MV) candidate list can be maintained for multiple motion vector (MV) predictors. The motion vector(s), as well as reference indices in the merge mode, of the current PU can be generated by taking one candidate from the MV candidate list.

In some examples, the MV candidate list can contain up to five MV candidates for the merge mode and two MV candidates for the AMVP mode. In other examples, different numbers of candidates can be included in a MV candidate list for merge mode and/or AMVP mode. A merge candidate may contain a set of motion information (e.g., motion vectors corresponding to one or both reference picture lists (list 0 and list 1)) and the reference indices. If a merge candidate is identified by a merge index, the reference pictures can be used for the prediction of the current block. The reference picture can also be used to determine associated motion vectors. An AVMP candidate contains only a motion vector; thus, in AVMP mode, a reference index may need to be explicitly signaled, together with an MVP index to the MV candidate list, for each potential prediction direction from either list 0 or list 1. In AMVP mode, the predicted motion vectors can be further refined.

As can be seen above, a merge candidate corresponds to a full set of motion information, while an AMVP candidate contains just one motion vector for a specific prediction direction and reference index. The candidates for both merge and AMVP modes can be derived similarly from the same spatial and/or temporal neighboring blocks.

Figure 4B:
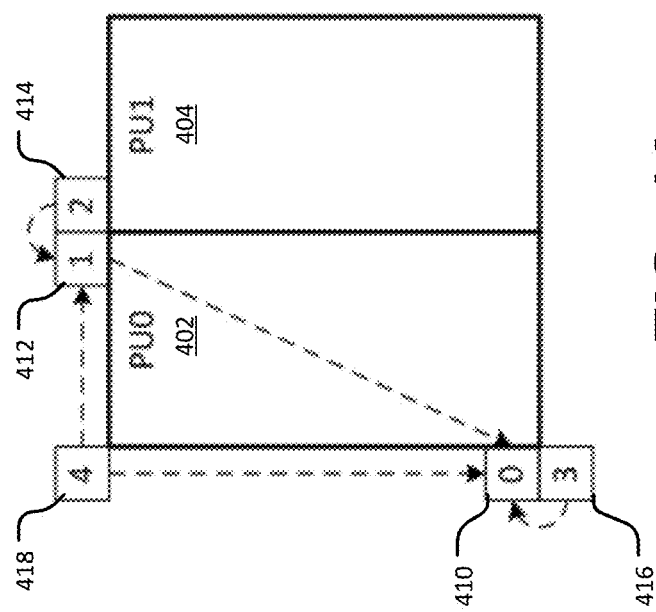
FIG. 4B is a diagram illustrating an example of a method for deriving spatial neighboring MV candidates for advanced motion vector prediction (AMVP) inter-prediction mode, in accordance with some examples.
Figure 4A:
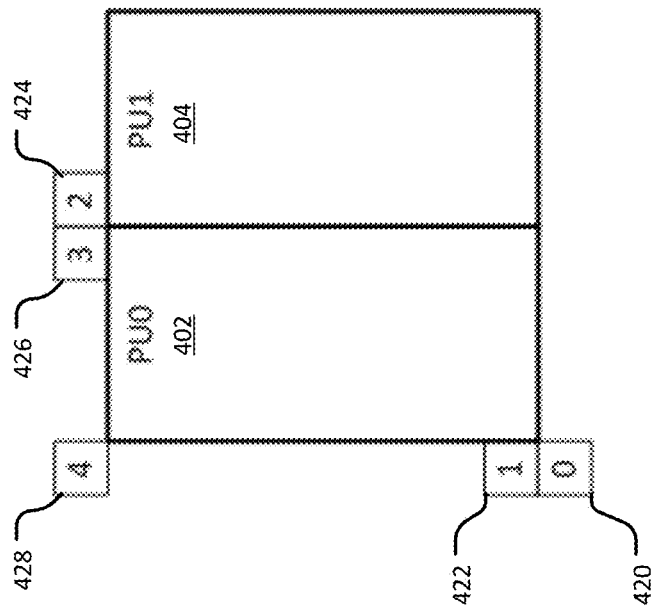
FIG. 4A is a diagram illustrating an example of a method for deriving spatial neighboring motion vector (MV) candidates for merge inter-prediction mode, in accordance with some examples.

FIG. 4A and FIG. 4B are diagrams illustrating example derivations of spatial neighboring MV candidates. Spatial MV candidates for a specific PU (PU0 402) can be derived from neighboring blocks, including relative to a neighboring PU1 404, located to the right of PU0 402.

The diagram in FIG. 4A illustrates derivation of spatial MV candidates for merge mode. In merge mode, up to five spatial MV candidates (and in some cases up to four) can be derived in, for example, the following order: a left candidate 410 (block 0), an above candidate 412 (block 1), an above right candidate 414 (block 2), a below left candidate 416 (block 3), and an above left candidate 418 (block 4). The locations of the spatial MV candidates with respect to PU0 402 is illustrated in FIG. 4A. Specifically, the left candidate 410 is located adjacent to and to the left of the lower left corner of PU0 402; the above candidate 412 is located adjacent to and above the upper right corner of PU0 402; the above right candidate 414 is located adjacent to and above the upper left corner of neighboring PU1 404; the below left candidate 416 is located below the left candidate 410; and the above left candidate 418 is located above and to the left of the upper left corner of PU0 402.

The diagram in FIG. 4B illustrates derivation of spatial neighboring MV candidates for AVMP mode. In AVMP mode, the neighboring blocks are divided into, for example, two groups. The first group, which can be referred to as a left group, can include a first block 420 (block 0), located below and to the left of PU0 402, and a second block 422 (block 1), located to the left of and adjacent to the lower left corner of PU0 402. The second group, which can be referred to as the above group, can include a third block 424 (block 2), located above and adjacent to the upper left corner of neighboring PU1 404, a fourth block 426 (block 3) located above and adjacent to the upper right corner of PU0 402, and a fifth block 428 (block 4), located above and to the left of the upper left corner of PU0 402. For each group, a potential candidate MV in a neighboring block referring to the same reference picture as that indicated by the signaled reference index can have the highest priority among blocks to be chosen to form a final candidate of the group. In some cases, it is possible that all neighboring blocks do not contain a motion vector pointing to the same reference picture. Therefore, if such a candidate cannot be found, the first available candidate can be scaled to form the final candidate, so that the temporal distance differences can be compensated.

In some cases, merge and AMVP modes can include other aspects, such as motion vector scaling, artificial motion vector candidate generation, and a pruning process for candidate insertion.

A quad-tree-binary-tree (QTBT) has been proposed for future video coding standard beyond HEVC. Simulations showed the proposed QTBT structure can be more efficient than quad-tree structure in used HEVC. In the proposed QTBT structure, a CTB is firstly partitioned using a quad-tree structure, where the quad-tree splitting of one node can be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is namely a CU, which can be used for prediction (e.g., intra-prediction or inter-prediction) and transform without any further partitioning. In some cases, there are two splitting types in the binary tree splitting—symmetric horizontal splitting and symmetric vertical splitting.

In one illustrative example of the QTBT partitioning structure, the CTU size can be set as 128×128 (luma samples and two corresponding 64×64 chroma samples), the MinQTSize can be set as 16×16, the MaxBTSize can be set as 64×64, the MinBTSize (for both width and height) can be set as 4, and the MaxBTDepth can be set as 4. The quad-tree partitioning is applied to the CTU first to generate quad-tree leaf nodes. In some examples, the quad-tree leaf nodes may have a size from 16×16 (in this case, the MinQTSize) to 128×128 (in this case, the CTU size). If the leaf quad-tree node is 128×128, it will not be further split by the binary tree since the size exceeds the MaxBTSize (in this case, 64×64). Otherwise, the leaf quad-tree node will be further partitioned by the binary tree. In this example, the quad-tree leaf node is also the root node for the binary tree and has the binary tree depth as 0. When the binary tree depth reaches MaxBTDepth (4 in this example), it implies that no further splitting. When the binary tree node has width equal to MinBTSize (4 in this example), it implies no further horizontal splitting. Similarly, when the binary tree node has height equal to MinBTSize (4 in this example), it implies no further vertical splitting. The leaf nodes of the binary tree are namely CUs, and can be further processed by prediction and transform without any further partitioning.

Figure 5A:
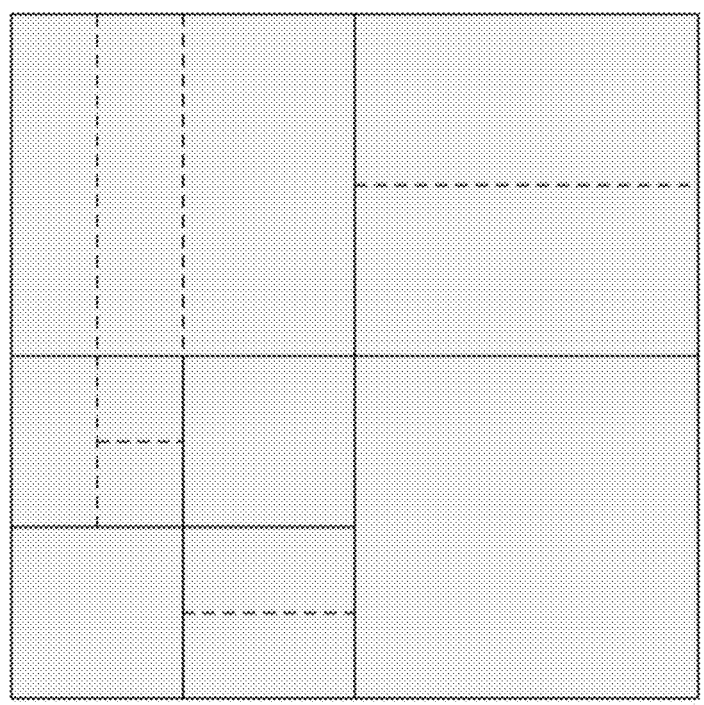
FIG. 5A is a diagram illustrating an example of block partitioning using a quad-tree-binary-tree (QTBT) structure, in accordance with some examples.
Figure 5B:
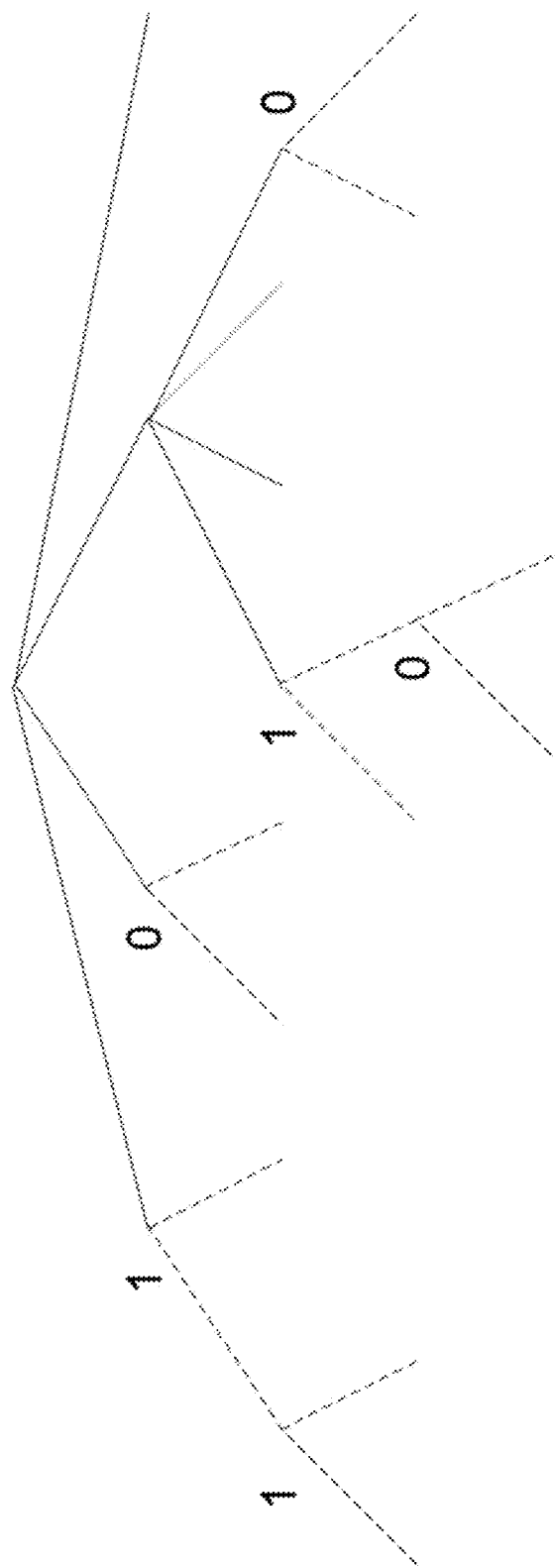
FIG. 5B is a diagram illustrating a corresponding tree structure to the block partitioning shown in FIG. 5A, in accordance with some examples.

FIG. 5A illustrates an example of block partitioning by using QTBT, and FIG. 5B illustrates the corresponding tree structure. The solid lines shown in FIG. 5A indicate quad-tree splitting, and the dotted lines indicate binary tree splitting. In each splitting node (referred to as a non-leaf node) of the binary tree, a flag can be signaled to indicate which splitting type (e.g., horizontal or vertical splitting) is used. In one illustrative example, a 0 value for the flag can indicate horizontal splitting and 1 value can indicate vertical splitting. In some cases, for the quad-tree splitting, there may be no need to indicate the splitting type since a block may always be split horizontally and vertically into four sub-blocks with an equal size.

In some examples, a multi-type-tree structure can be used. For instance, a tree node may be further split with multiple tree types, such as binary tree, a symmetric center-side triple tree, and a quad-tree. Simulations have shown that the multi-type-tree structure can be much more efficient than the QTBT structure.

Figure 6:
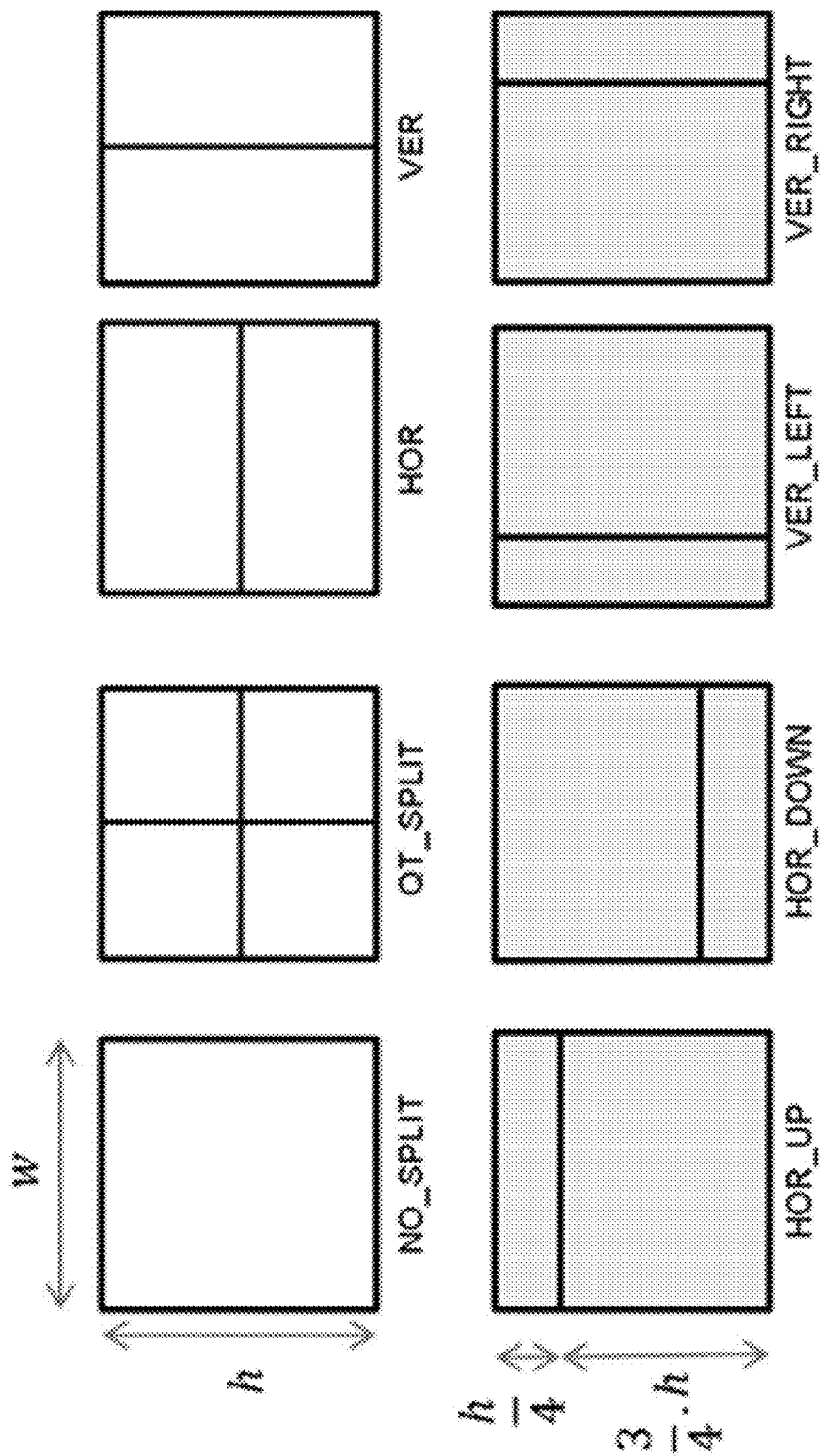
FIG. 6 is a diagram illustrating an example of a set of coding unit (CU) splitting modes available in QTBT, in accordance with some examples.

In some cases, asymmetric coding units can be used on top of the QTBT structure. For example, four new binary tree splitting modes can be introduced into the QTBT framework, allowing new splitting configurations. FIG. 6 is a diagram illustrating asymmetric splitting modes that can be used in addition to the splitting modes already available in QTBT. According to the additional asymmetric splitting modes, a coding unit with size S is divided into two sub-CU with sizes S/4 and 3.S/4, either in the horizontal or in the vertical direction. In JVET-D0064, the newly added CU width or height can only be 12 or 24.

Figure 7:
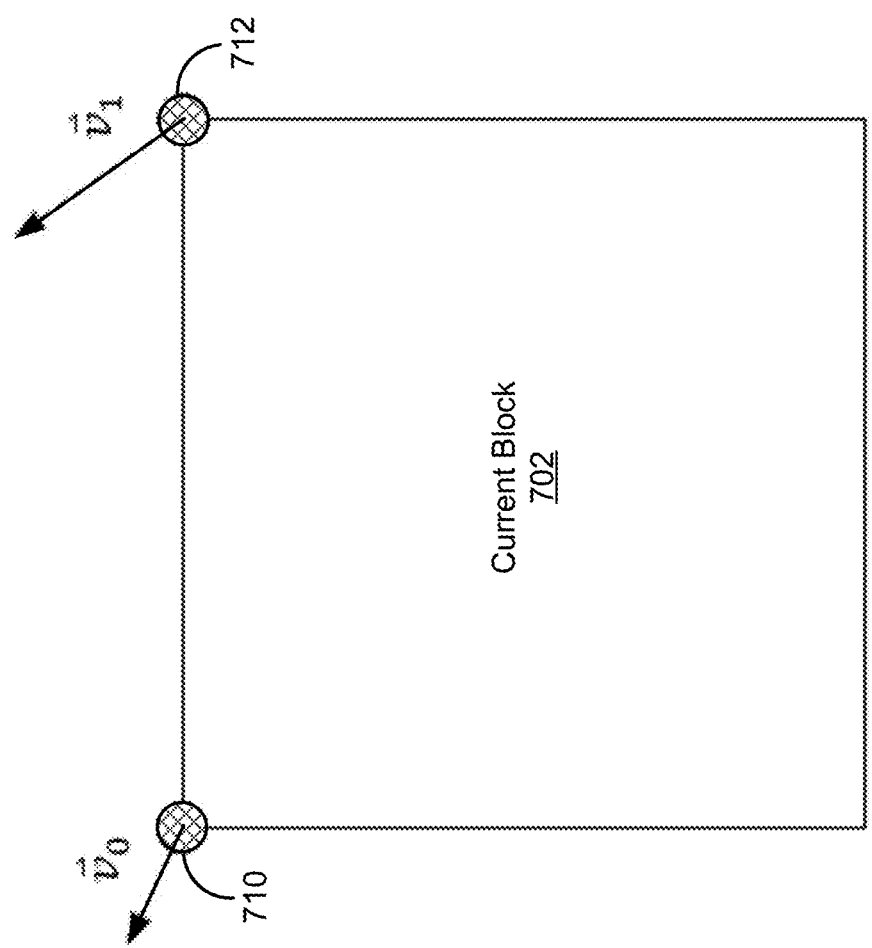
FIG. 7 is a diagram illustrating an example of a simplified affine motion model for a current block, in accordance with some examples.

In HEVC and earlier video coding standards, only a translational motion model is applied for motion compensation prediction (MCP). For example, a translational motion vector can be determined for each block (e.g., each CU or each PU) of a picture. However, in the real world, there are more kinds of motions other than translational motion, including zooming (e.g., zooming in and/or out), rotation, perspective motions, among other irregular motions. In the Joint exploration model (JEM) by ITU-T VCEG and MPEG, a simplified affine transform motion compensation prediction cam be applied to improve coding efficiency. As shown FIG. 7, the affine motion field of a current block 702 is described by two motion vectors $\vec{v}_0$ and $\vec{v}_1$ of two control points 710 and 712. Using the motion vector $\vec{v}_0$ of the control point 710 and the motion vector $\vec{v}_1$ of the control point 712, the motion vector field (MVF) of the current block 702 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}, \quad \text{Equation (1)}$$

where $V_x$ and $V_y$ is the motion vector for each pixel within the current block 702, x and y is the position of each pixel within the current block 702 (e.g., the top-left pixel in a block can have coordinate or index (x, y)=(0,0)), $(v_{0x}, v_{0y})$ is the motion vector of the top-left corner control point 710, w is the width of the current block 702, and $(v_{1x}, v_{1y})$ is the motion vector of the top-right corner control point 712. The $v_{0x}$ and $v_{1x}$ values are horizontal values for the respective motion vectors, and $v_{0y}$ and $v_{1y}$ values are the vertical values for the respective motion vectors. Additional control points (e.g., four control points, six control points, eight control points, or some other number of control points) can be defined by adding additional control point vectors, for example at the lower corners of the current block 702, the center of the current block 702, or other position in the current block 702.

Equation (1) above illustrates a 4-parameter motion model, where the four affine parameters a, b, c, and d are defined as:

$$a = \frac{(v_{1x} - v_{0x})}{w}; b = \frac{(v_{1y} - v_{0y})}{w}; c = v_{0x};$$

and $d=v_{0y}$. Using equation (1), given the motion vector $(v_{0x}, v_{0y})$ of the top-left corner control point 710 and the motion vector $(v_{1x}, v_{1y})$ of the top-right corner control point 712, the motion vector for every pixel of the current block can be calculated using the coordinate (x, y) of each pixel location. For instance, for the top-left pixel position of the current block 702, the value of (x, y) can be equal to (0, 0), in which case the motion vector for the top-left pixel becomes $V_x = v_{0x}$ and $V_y = v_{0y}$.

Figure 8:
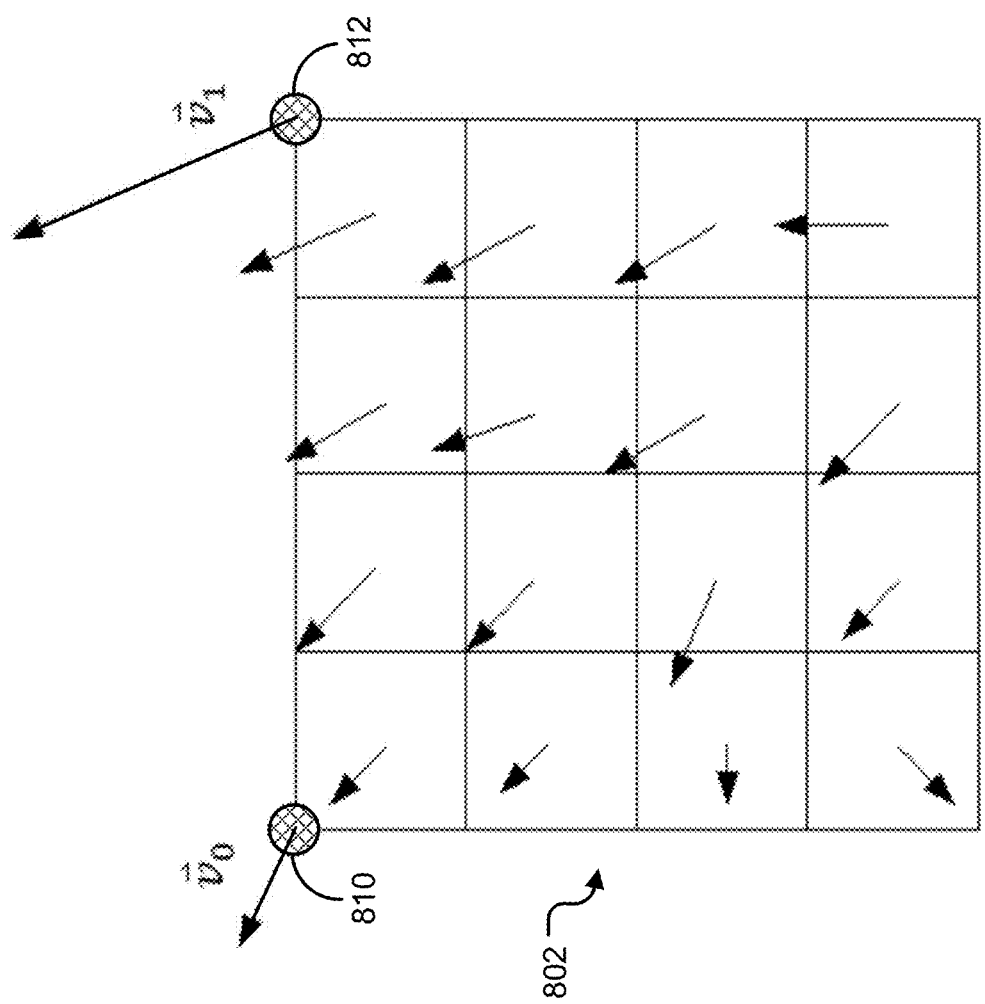
FIG. 8 is a diagram illustrating an example of a motion vector field of sub-blocks of a block, in accordance with some examples.

In order to further simplify the MCP, block-based affine transform prediction can be applied. For example, as shown in FIG. 8, a current block 802 can be divided into sub-blocks. The example shown in FIG. 8 includes a 4×4 partition, with sixteen total sub-blocks. Any suitable partition and corresponding number of sub-blocks can be used. A motion vector can then be derived for each sub-block using equation (1). For example, to derive a motion vector of each the 4×4 sub-blocks, the motion vector of the center sample of each sub-block (as shown in FIG. 8) is calculated according to equation (1). The resulting motion vector can be rounded, for example to a 1/16 fraction accuracy or other suitable accuracy (e.g., 1/4, 1/8, or the like). Motion compensation can then be applied using the derived motion vectors of the sub-blocks to generate the prediction of each sub-block. For example, a decoding device can receive the four affine parameters (a, b, c, d) describing the motion vectors $\vec{v}_0$ of the control point 810 and the motion vector $\vec{v}_1$ of the control point 812, and can calculate the per-sub-block motion vector according to the pixel coordinate index describing the location of the center sample of each sub-block. After MCP, the high accuracy motion vector of each sub-block can be rounded, as noted above, and can be saved as the same accuracy as the translational motion vector.

Figure 9:
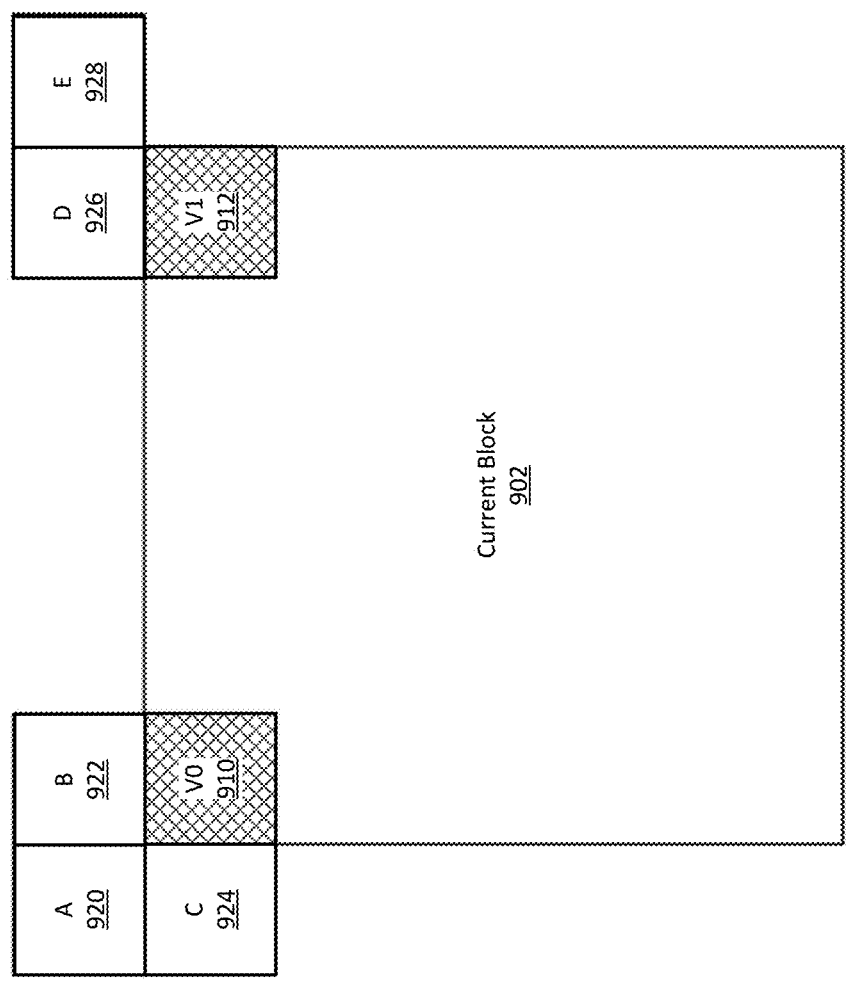
FIG. 9 is a diagram illustrating an example of motion vector prediction in affine inter (AF_INTER) mode, in accordance with some examples.

In JEM, there are two affine motion modes: affine inter (AF_INTER) mode and affine merge (AF_MERGE) mode. FIG. 9 is a diagram illustrating an example of motion vector prediction in AF_INTER mode. In some examples, when a CU has a width and height larger than 8 pixels, AF_INTER mode can be applied. An affine flag can be placed (or signaled) in the bitstream in relation to a block (e.g., at the CU level), to indicate whether AF_INTER mode was applied to the block. As illustrated in the example of FIG. 9, in AF_INTER mode, a candidate list of motion vector pairs can be constructed using neighboring blocks. For example, for a sub-block 910, located in the upper left corner of a current block 902, a motion vector $v_0$ can be selected from a neighboring block A 920 above and to the left of the sub-block 910, neighboring block B 922 above the sub-block 910, and neighboring block C 924 to the left of the sub-block 910. As a further example, for a sub-block 912, located in the upper right corner of the current block 902, a motion vector $v_1$ can be selected from neighboring block D 926 and neighboring block E 928 in the above and the above-right directions, respectively. A candidate list of motion vector pairs can be constructed using the neighboring blocks. For example, given motion vectors $v_A$, $v_B$, $v_C$, $v_D$, and $v_E$ corresponding to blocks A 920, B 922, C 924, D 926, and E 928, respectively, the candidate list of motion vector pairs can be expressed as $\{(v_0, v_1)|v_0=\{v_A, v_B, v_C\}, v_1=\{v_D, v_E\}\}$.

As noted above and as shown in FIG. 9, in AF_INTER mode, the motion vector $v_0$ can be selected from the motion vectors of the blocks A 920, B 922, or C 924. The motion vector from the neighboring block (block A, B, or C) can be scaled according to the reference list and the relationship among the POC of the reference for the neighboring block, the POC of the reference for the current CU (e.g., the current block 902), and the POC of the current CU. In these examples, some or all of the POCs can be determined from a reference list. Selection of $v_1$ from the neighboring blocks D or E is similar to the selection of $v_0$.

In some cases, if the number of candidate lists is less than two, the candidate list can be padded with motion vector pairs by duplicating each of the AMVP candidates. When the candidate list is larger than two, in some examples, the candidates in the candidate list can first be sorted according to the consistency of the neighboring motion vectors (e.g., consistency can be based on the similarity between the two motion vectors in a motion vector pair candidate). In such examples, the first two candidates are kept and the rest may be discarded.

In some examples, a rate-distortion (RD) cost check can used to determine which motion vector pair candidate is selected as the control point motion vector prediction (CPMVP) of the current CU (e.g., the current block 902). In some cases, an index indicating the position of the CPMVP in the candidate list can be signaled (or otherwise indicated) in the bitstream. Once the CPMVP of the current affine CU is determined (based on the motion vector pair candidate), affine motion estimation can be applied, and the control point motion vector (CPMV) can be determined. In some cases, the difference of the CPMV and the CPMVP can be signalled in the bitstream. Both CPMV and CPMVP include two sets of translational motion vectors, in which case the signaling cost of affine motion information is higher than that of translational motion.

FIG. 10A and FIG. 10B illustrate an example of motion vector prediction in AF_MERGE mode. When a current block 1002 (e.g., a CU) is coded using AF_MERGE mode, a motion vector can be obtained from a valid neighboring reconstructed block. For example, the first block from the valid neighbor reconstructed blocks that is coded with affine mode can be selected as the candidate block. As shown in FIG. 10A, the neighboring block can be selected from among a set of neighboring blocks A 1020, B 1022, C 1024, D 1026, and E 1028. The neighboring blocks may be considered in a particular selection order for being selected as the candidate block. One example of a selection order is the left neighbor (block A 1020), followed by the above neighbor (block B 1022), then the above right neighbor (block C 1024), then the left bottom neighbor (block D 1026), and then the above left neighbor (block E 1028).

As noted above, the neighboring block that is selected can be the first block (e.g., in the selection order) that has been coded with affine mode. For example, block A 1020 may have been coded in affine mode. As illustrated in FIG. 10B, block A 1020 can be included in a neighboring CU 1004. For the neighboring CU 1004, motion vectors for the top left corner ($v_2$ 1030), above right corner ($v_3$ 1032), and left bottom corner ($v_4$ 1034) of the neighboring CU 1004 may have been derived. In this example, a control point motion vector, $v_0$ 1040, for the top left corner of the current block 1002 is calculated according to $v_2$ 1030, $v_3$ 1032, and $v_4$ 1034. The control point motion vector, $v_1$ 1042, for the top right corner of the current block 1002 can then be determined.

Once the control point motion vectors (CPMV), $v_0$ 1040 and $v_1$ 1042, of the current block 1002 have been derived, equation (1) can be applied to determine a motion vector field for the current block 1002. In order to identify whether the current block 1002 is coded with AF_MERGE mode, an affine flag can be included in the bitstream when there is at least one neighboring block coded in affine mode.

In many cases, the process of affine motion estimation includes determining affine motion for a block at the encoder side by minimizing the distortion between the original block and the affine motion predicted block. As affine motion has more parameters than translational motion, affine motion estimation can be more complicated than translational motion estimation. In some cases, a fast affine motion estimation method based on Taylor expansion of signal can be performed to determine the affine motion parameters (e.g., affine motion parameters a, b, c, d in a 4-parameter model).

The fast affine motion estimation can include a gradient-based affine motion search. For example, given a pixel value $I_t$ at time t (with t0 being the time of the reference picture), the first order Taylor expansion for the pixel value $I_t$ can be determined as:

$$I_t = I_{t0} + \frac{\partial I_{t0}}{\partial t}(t - t0) = \qquad \text{Equation (2)}$$
$$I_{t0} + \frac{\partial I_{t0}}{\partial x} \cdot \frac{\partial x}{\partial t} \cdot (t - t_0) + \frac{\partial I_{t0}}{\partial y} \cdot \frac{\partial y}{\partial t} \cdot (t - t_0)$$

$$\frac{\partial I_{t0}}{\partial x} \text{ and } \frac{\partial I_{t0}}{\partial y}$$

Where are the pixel gradient $G_{0x}$, $G_{0y}$ in the x and y directions, respectively, while $$\frac{\partial x}{\partial t} \cdot (t-t_0) \text{ and } \frac{\partial y}{\partial t} \cdot (t-t_0)$$

indicate the motion vector components $V_x$ and $V_y$ for the pixel value $I_t$. The motion vector for the pixel $I_t$ in the current block points to a pixel $I_{to}$ in the reference picture.

The equation (2) can be rewritten as equation (3) as follows:

$$I_t = I_{to} + G_{x0} \cdot V_x + G_{y0} \cdot V_y \quad \text{Equation (3)}$$

The affine motion $V_x$ and $V_y$ for the pixel value $I_t$ can then be solved by minimizing the distortion between the prediction ($I_{to} + G_{x0} \cdot V_x + G_{y0} \cdot V_y$) and the original signal. Taking 4-parameter affine model as an example, $$V_x = a \cdot x - b \cdot y + c \quad \text{Equation (4)}$$

$$V_y = b \cdot x + a \cdot y + d, \quad \text{Equation (5)}$$

where x and y indicate the position of a pixel or sub-block. Taking equations (4) and (5) into equation (3), and then minimizing the distortion between original signal and the prediction using equation (3), the solution of affine parameters a, b, c, d can be determined:

$$\{a,b,c,d\} = \text{argmin}\{\Sigma_{i \in current\ template}(I_t^i - I_{t0}^i - G_{x0}^i \cdot (a \cdot x + b \cdot y + c) - G_{y0}^i \cdot (b \cdot x - a \cdot y + d))^2\} \quad \text{Equation (6)}$$

Any number of parameters can be used. For instance, a 6-parameter affine motion or other affine motion can be solved in the same way as that described above for the 4-parameter affine motion model.

Once the affine motion parameters are determined, which define the affine motion vectors for the control points, the per-pixel or per-sub-block motion vectors can be determined using the affine motion parameters (e.g., using equations (4) and (5), which are also represented in equation (1)). Equation (3) can be performed for every pixel of a current block (e.g., a CU). For example, if a current block is 16 pixels×16 pixels, he least squares solution in equation (6) can then be used to derive the affine motion parameters (a, b, c, d) for the current block by minimizing the overall value over the 256 pixels.

Various problems arise when the above-described affine motion modeling techniques are used. One problem includes the high signaling cost of using the affine motion model. For example, the high signaling cost is due, at least in part, to the need for the affine motion parameters to be signaled in the bitstream in order for the decoder to derive the motion vectors for the pixels or sub-blocks of the blocks in the pictures. Further, the functions of bilateral matching-based affine motion derivation can be too complicated to solve, leading to the use of large amounts of processing resources.

Methods and systems are described herein for performing decoder-side affine motion derivation, which addresses at least the problems noted above. Any of the techniques described herein can be applied individually, or any suitable combination of the techniques can be applied. Using the techniques described herein, a decoding device (also referred to as a video decoder or a decoder) can determine affine motion parameters for one or more blocks of video pictures. The techniques can be performed without requiring affine motion information to be sent to the decoding device. For instance, affine motion parameters (or the differences between affine motion parameters and the predictors of affine motion parameters) do not need to be signaled in the bitstream for such an affine motion derivation mode to be performed by a decoding device. In some cases, translational motion can be regarded as special affine motion.

Templates can be used to perform the decoder-side affine motion derivation for a current block. The affine motion derivation using templates can be referred to as template matching based affine motion derivation. The template matching based affine motion derivation can be used to derive affine motion information (e.g., affine motion vectors) at the decoder side. For example, a current affine template can include spatially neighboring reconstructed samples (e.g., pixels) of a current block, and a reference affine template of a reference picture can include samples (e.g., pixels) in a reference picture that correspond to the samples in the current affine template. The current affine template and the reference affine template can be used to determine affine motion parameters for the current block. The affine motion parameters define the affine motion vectors for the control points of the current affine template. For example, the affine motion parameters (e.g., the a, b, c, d, parameters defining the motion vectors) of control points of the current affine template can be derived by minimizing the error (or distortion) between the affine prediction (associated with the samples in the reference affine template) and reconstructed samples of the current affine template of the current block. The derived affine motion parameters define the affine motion vectors for the control points. The affine motion vectors of the control points can then be used to determine motion vectors for pixels or sub-blocks of the current block.

In some examples, the current affine template of a current block (for which affine motion is to be derived) is a block or region of samples from one or more neighboring blocks, with the boundaries of the current affine template sharing one or more boundaries with the current block. In some examples, the current affine template can be the top boundary or the left boundary of the block for which affine motion is to be derived. In some cases, the current affine template is in an L-shape. For example, the current affine template can share the top boundary and the left boundary of the current block. In other cases, the affine template can be any other suitable shape. In some examples, the affine template can include reconstructed pixels in one or more reference pictures of the current block (e.g., the collocated picture used for temporal MV prediction in HEVC). In such examples, the derived affine motion vectors can be scaled according to the POC distance of current picture, the target reference picture of current block, and the reference picture where the affine template is located.

Figure 11A:
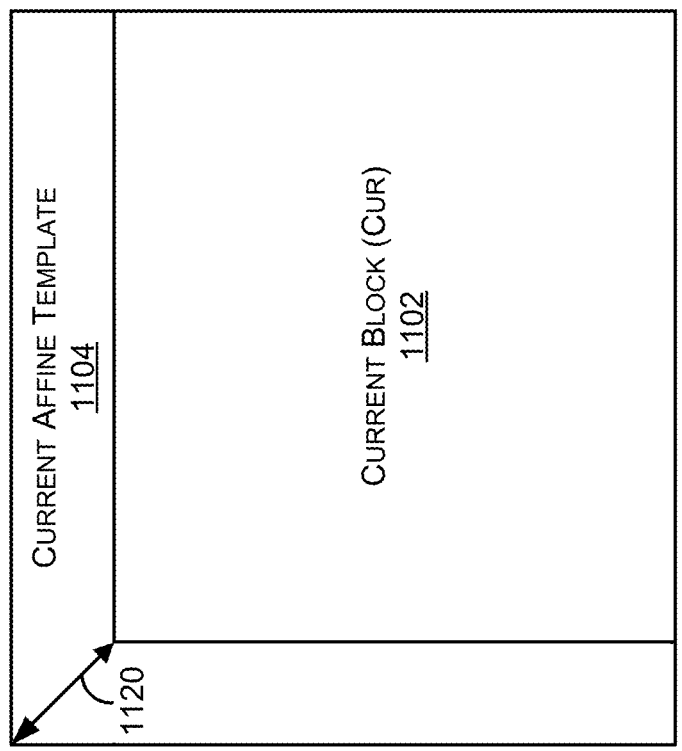
FIG. 11A is a diagram illustrating an example of a current block and a current affine template of the current block, in accordance with some examples.

FIG. 11A is a diagram illustrating a current block 1102 and an example of a current affine template 1104 of the current block 1102. The current block 1102 can be a coding unit (CU), a prediction unit (PU), or any other suitable block of a picture. The pixels in the current affine template 1104 include previously reconstructed pixels from blocks that are neighboring the current block 1102. In the example of FIG. 11A, the current affine template 1104 is in an L-shape pattern, which can be useful for determining control points that can be positioned at the top-left corner and the top-right corner of the current affine template 1104.

Figure 11B:
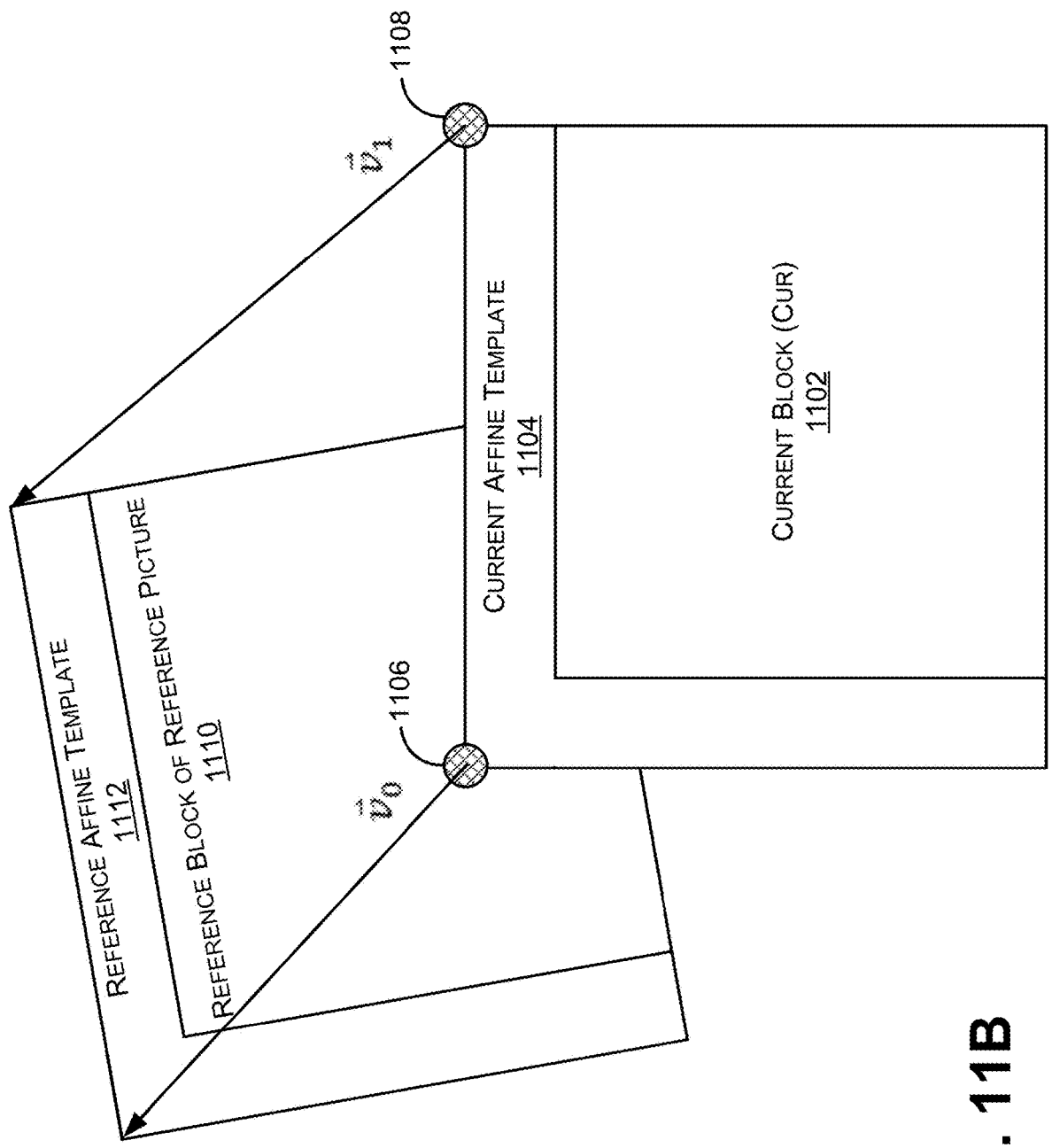
FIG. 11B is a diagram illustrating a current block with a current affine template and a reference block of a reference picture with a reference affine template, in accordance with some examples.

FIG. 11B is a diagram illustrating the current block 1102 with the current affine template 1104 and a reference block 1110 of a reference picture with a reference affine template 1112. While the reference affine template 1112 is shown in FIG. 11B as being the same shape as the current affine template 1104, the reference affine template 1112 may not be the same shape as the current affine template 1104, depending on where the reference pixels are for the pixels of the current affine template 1104, given a certain set of affine motion parameters. Control points 1106 and 1108 are defined for the current block 1102. The control point 1106 is located the top left corner of the current affine template 1104, and the control point 1108 is located at the top right corner of the current affine template 1104. As noted above, affine motion vectors $\vec{v}_0$ and $\vec{v}_1$ for the control points 1106 and 1108 of the current block 1102 can be derived by minimizing the distortion between the affine prediction (corresponding to the pixels of the reference affine template 1112) and reconstructed pixels of the current affine template 1104 of the current block 1102. For example, using the pixels of the current affine template 1104 and co-located pixels in the reference affine template 1112, the above equations (2)-(6) can be used to iteratively solve for affine motion parameters (e.g., a, b, c, d) until an optimal set of affine motion parameters are determined for the control points 1106 and 1108 of the current block 1102.

An initial motion vector (also referred to as an initial motion vector seed or a seed) is needed to determine the first iteration of affine motion parameters. The initial motion vector is needed by the decoding device to identify the reference affine template 1112. For example, the initial motion vector points to the reference affine template 1112, and thus can be used to identify which reference picture, and where in that reference picture (corresponding to the reference affine template 1112), to search for the information needed to derive the affine motion parameters for the current block 1102. The search for the affine motion parameters in the reference block 1110 of the reference picture is performed around the pixel referenced by the initial motion vector.

Figure 11C:
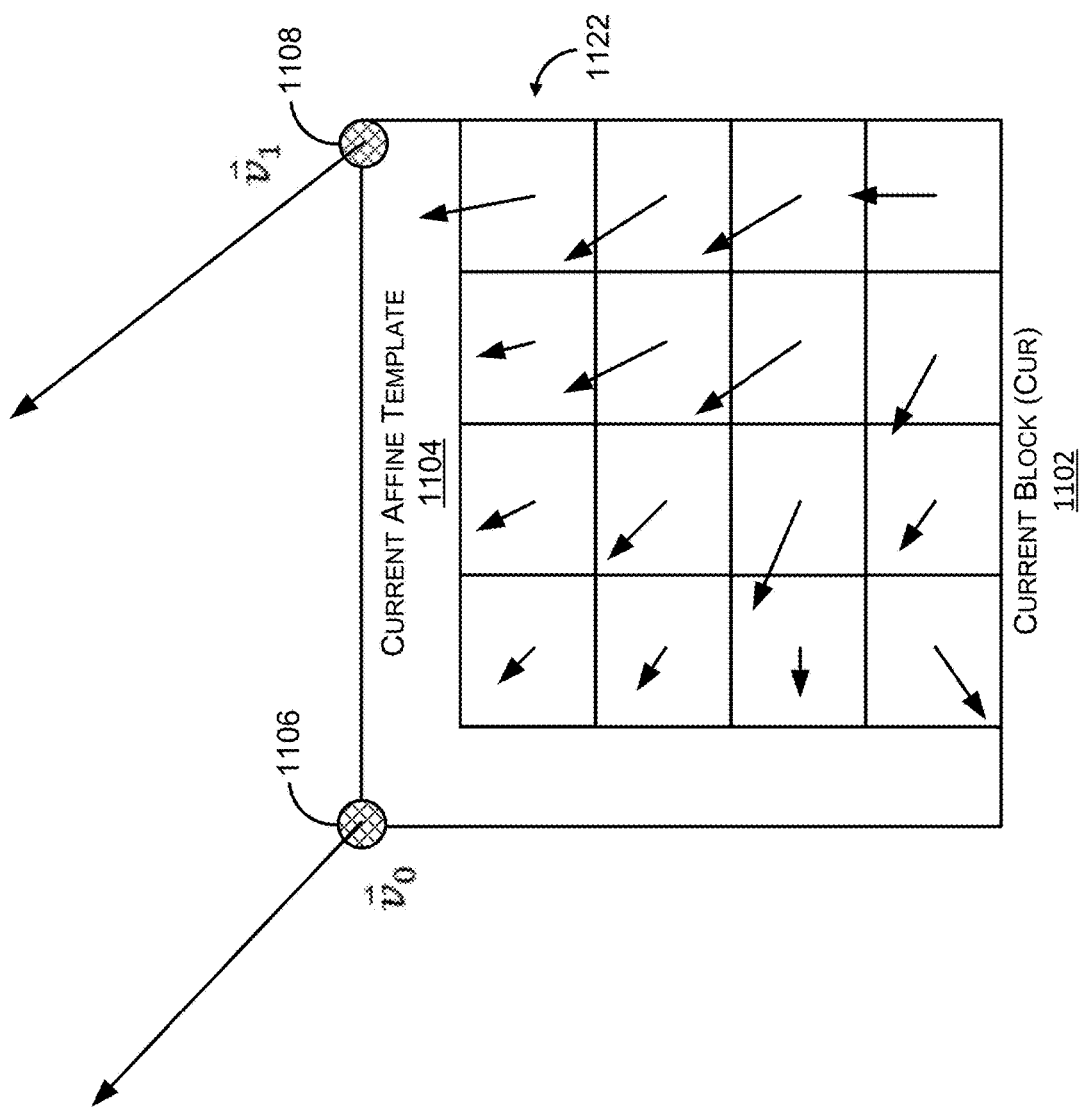
FIG. 11C is a diagram illustrating an example of a motion vector field of sub-blocks of a block, in accordance with some examples.

The initial motion vector can be determined using any suitable technique. For example, a best translational motion vector can be determined for the current block 1102, and can be used as the initial motion vector for deriving the affine motion for the current block 1102. It is noted that a translational motion vector is determined for an entire block (e.g., the current block 1102), while affine motion vectors are determined for all pixels or for certain sub-blocks of a block. In some cases, frame rate up-conversion (FRUC) template matching can be performed to determine a translational motion vector for the entire current block 1102. For example, template matching can be used to derive translational motion information of the current block 1102 by finding the best match between a template (top and/or left neighboring blocks of the current block) in the current picture and a block (e.g., same size as the template) in a reference picture. The template used for FRUC template matching can be the same template or can be a different template than the current affine template 1104. In one illustrative example, the current affine template 1104 is an L-shape (as shown in FIG. 11A-FIG. 11C), while the FRUC template matching template can have a shape like the template 1216 shown in FIG. 12, which is discussed in more detail below.

FRUC mode can be considered as a special type of merge mode, with which motion information of a block is not signaled but derived at the decoder side. Two types of FRUC mode include bilateral matching and template matching. In some cases, a FRUC flag can be signalled for a block (e.g., a CU or the like) when a merge flag is true for the block. When the FRUC flag is false, a merge index can be signaled and the regular merge mode can be used. When the FRUC flag is true, an additional FRUC mode flag can be signaled to indicate which FRUC mode (e.g., bilateral matching or template matching) is to be used to derive translational motion information for the block.

During the translational motion derivation process, an initial translational motion vector can be derived for the whole block (e.g., CU or the like) using bilateral matching or template matching. The merge motion vector (MV) candidate list of the block can be checked, and the candidate motion vector from the merge MV candidate list that leads to the minimum matching cost can selected as the initial translational motion vector, and the pixel in the reference picture can be used as a starting point for a local search. For example, a local search based on bilateral matching or template matching can be performed around the starting point, and the motion vector that results in the minimum matching cost can be taken as the motion vector for the whole CU. Subsequently, the motion information can be further refined at the sub-block level with the derived CU motion vectors as the starting points.

Figure 12:
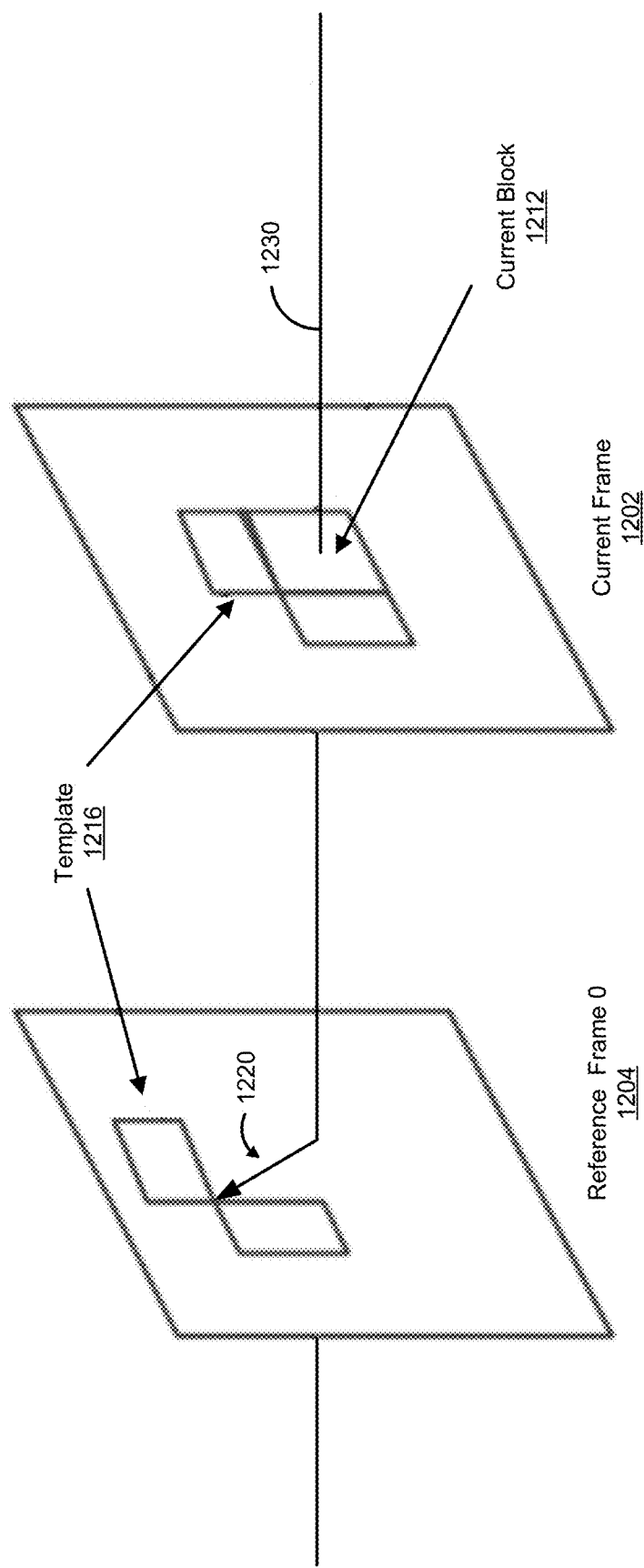
FIG. 12 is a diagram illustrating an example of template matching based motion estimation for FRUC, in accordance with some examples.

As noted above, the FRUC template matching mode can be performed to determine a translational motion vector for the current block 1102. FIG. 12 illustrates an example of template matching. In template matching, a template 1216 can be used to derive motion information from a Reference Frame 0 1204. For example, the template 1216 can include top and/or left neighboring blocks of a current block 1212 in a current frame 1202. In this example, a set of blocks can be found in Reference Frame 0 1204 that best match the template 1216, where the set of blocks are the same size and/or configuration as the template 1216. A motion vector 1220 can then be determined, using the location of the set of blocks and a relative location of the current block 1212 in Reference Frame 0 1204. The relative location of the current block 1212 can be determined from an orthogonal axis 1230 through, for example, the center of the current block 1212.

FRUC template matching can be performed for bi-predicted or uni-predicted blocks. For instance, template matching can be performed for each reference picture list independently. The template 1216 includes previously reconstructed pixels in the current picture. The motion of the current block 1212 is determined using the neighboring pixels in the template 1216. At the decoder side, the best translational motion for the template 1216 is determined, and is used as the translational motion vector of the current block 1212. The search process can include searching for the minimum SAD between the template of the current block 1212 and the template in the reference picture.

Figure 13:
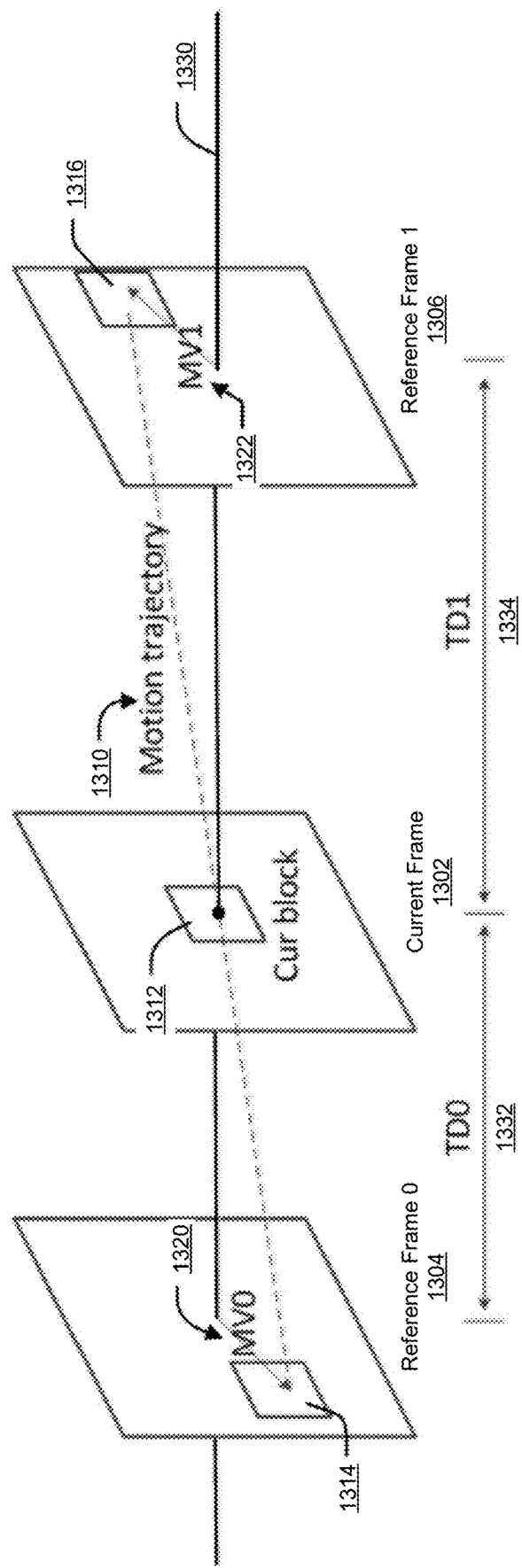
FIG. 13 is a diagram illustrating an example of bilateral matching based motion estimation for frame rate up-conversion (FRUC), in accordance with some examples.

Another FRUC mode includes bilateral matching. FIG. 13 illustrates an example of bilateral matching. In bilateral matching, the motion information for a current block 1312 in a current frame 1302 can be derived, where the current frame 1302 is being generated for frame rate up-conversion. Specifically, a continuous motion trajectory 1310 can be assumed between a first block 1314 in a first reference frame (Reference Frame 0 1304) and a second block 1316 in a second reference frame (Reference Frame 1 1306). A motion vector MV0 1320 relative to Reference Frame 0 1304 can be determined for the current block 1312. For example, the current block's position in Reference Frame 0 1304, as determined by an orthogonal axis 1330 centered on the current block 1312, can be used to determine MV0 1320. Similarly, a motion vector MV1 1322 relative to Reference Frame 1 1306 can be determined using the current block's position in Reference Frame 1 1306, as given by the orthogonal axis 1330. Because the motion trajectory 1310 is assumed to be continuous, MV0 1320 and MV1 1322 can be proportional to the temporal distances (TD0 1332 and TD1 1334, respectively) between the current frame 1302 and the two reference frames 1304 and 1306. For example, MV0 1320 can be scaled based on TD0 1332, and MV1 can be scaled based on TD1 1334.

In some cases, TD0 1332 and TD1 1334 can be the same. In these cases, the results from bilateral matching can be the same as the results from mirror-based bi-direction motion vector derivation. In some cases, bilateral matching can be used to determine the initial motion vector (the translational motion vector) for the first iteration of the template matching based affine motion derivation.

At an encoder, whether to use FRUC mode for a CU can be based on a rate distortion cost selection, as done, for example, for a normal merge candidate. That is, a rate distortion optimization (RDO) cost can be determined for each of the two matching modes (e.g., bilateral matching and template matching) for a given CU. The matching mode that has the lowest cost can further be compared to other CU modes. When a FRUC matching mode has the lowest cost, a FRUC flag can be set to indicate to a decoding device that FRUC merge mode should be used for a CU. Additionally, the matching mode to be used can also be indicated in the bitstream (e.g., in the PPS, SPS, VPS, in an SEI message, or the like). For example, it can be indicated in the bitstream that FRUC template matching is to be used to determine the initial affine motion vector for the first iteration of the template matching based affine motion derivation. The decoding device can then determine, based on the indication in the bitstream (e.g., a variable, flag, or other syntax item in the PPS, SPS, VPS, in an SEI message, or the like).

In some examples, an optical-flow-based motion refinement may follow the FRUC template matching to obtain a translational motion vector with a higher precision. In some examples, the best translational motion vector may directly be used as the initial motion vector seed for the affine motion derivation.

In some examples, if there are any neighboring blocks that have an affine motion vector, the affine motion vector of a neighboring block can be used as the initial motion vector seed for the affine motion derivation. For example, the affine merge (AF_MERGE) mode described above may be used to determine an initial motion vector for the template matching based affine motion derivation. In some cases, a distance (e.g., the SAD or the like) can be determined for the template matching translational motion vector (derived by FRUC template matching) and for the affine motion vector (of neighboring block), and the motion vector that has the smallest distance can be used. In some cases, the affine motion vector of the neighboring block can be directly used as the initial motion vector seed.

In some cases, when a rotation-invariant and/or a scale-invariant operator is available (e.g., from an upstream computer-vision subsystem, from an upstream pre-processing sub-block in the same video processing pipeline, or the like), the correspondences of the key-points may be used to derive the affine parameters. In one illustrative example, in a 4-parameter or a 6-parameter affine model, two (e.g., for a 4-parameter), three (e.g., for a 6-parameter), or more corresponding key-points may be found as the Scale Invariant Feature Transform (SIFT) feature points in the local neighborhood or search area, and the associated affine parameters can be derived with fewer number of iterations when taking the set of parameters as an initial point. The scale parameter may be derived using the correspondence of two key-points.

In some implementations, an affine model (e.g., a 4-parameter affine model or a 6-parameter affine model) can be determined based on previously coded information, such as block size and frame type.

The motion vector (e.g., a translational motion vector determined using template matching or an affine motion vector from a neighboring block) can then be used as the initial motion vector for the affine motion search. Returning to FIG. 11B, the initial motion vector seed points to a certain pixel within the reference picture, defining where in the reference block 1110 the reference template 1112 will be located for use by a decoding device. The decoding device can then use the current template 1104 and the reference template 1112 to perform the affine motion derivation for the current block 1102. Once the initial motion vector seed is determined, a method based on Taylor expansion (such as the Taylor expansion-based method described above with respect to equations (2)-(6)) can be used to solve affine motion based on the current affine template 1104 and its affine prediction (represented by the reference affine template 1112). In some cases, the affine motion may be derived iteratively, as described further below. The maximum number of iterations may be predefined or signaled. Alternatively or additionally, the number of iterations may depend on the context, such as the size of current affine template 1104 (or current block), the prediction direction (bi-prediction or uni-prediction), or any other suitable factor. In some cases, an interpolation filter other than the one used in regular inter interpolation process, such as bi-linear interpolation filter, may be used to solve affine motion.

As noted above, once the initial motion vector is determined, equations (2)-(6) described above can be used to solve for a first iteration of affine motion parameters (the initial iteration using the initial motion vector seed). As described previously, the affine motion parameters can include the parameters a, b, c, d, defined as:

$$a = \frac{(v_{1x} - v_{0x})}{w}; b = \frac{(v_{1y} - v_{0y})}{w}; c = v_{0x};$$

and $d=v_{0y}$. After the first iteration is performed with an initial set of affine motion parameters (an initial set of a, b, c, d values of an initial motion model), a new set of affine motion parameters is determined by equation (6). For example, the known values $V_x^{init}$ and $V_y^{init}$ of the initial motion vector seed and the known (x, y) position of the pixel or sub-block (in the current block 1102) relating to the initial motion vector seed can be used to determine the initial set of affine motion parameters a, b, c, d using equations (4)-(6). When deriving the affine motion parameters in the first iteration, the initial affine motion model can be used to derive per-pixel motion for every pixel (or in some cases, less than all pixels) within the current affine template 1104. For instance, the initial a, b, c, d values of the initial affine motion model can be inserted into equations (4) and (5), or into the equivalent equation (1), to determine the motion vector (defined by $V_x$ and $V_y$) for each pixel (at location (x, y)) of the current affine template 1104. A reference template pixel can then be located by the motion vector determined for each pixel within the current template 1104. For example, the decoding device can locate the reference pixel $I_{r0}^i$ for each pixel $I_t^i$ within current template 1104 using the determined affine motion parameters, where i is the pixel index. Those corresponding reference pixels $I_{r0}{}^i$ in the reference block 1110 form the reference template 1112. The decoding device will then have the pixels $I_t{}^i$ within the current template 1104 and the pixels $I_{r0}{}^i$ within the reference template 1112, and can calculate the horizontal gradient $G_{x0}{}^i$ and the vertical gradient $G_{y0}{}^i$ for each pixel within the reference template 1112. As noted above, i is the index for the pixels within the current affine template 1104 and the reference affine template 1112. Equation (6) can then be used to solve the affine motion parameters (a, b, c, d) for the current block 1102. For example, the decoding device can derive the new affine motion parameters using equation (6) and the known values, including the pixel values and (x, y) locations for the pixels $I_t{}^i$ and $I_{r0}{}^i$, the vertical gradient $(G_{y0}{}^i)$, and the horizontal gradient $(G_{x0}{}^i)$ (where the vertical and horizontal gradients represent the gradient around reference pixel $I_{r0}{}^i$).

Each iteration includes performing equations (4)-(6). For example, equations (4) and (5) can be used to locate new reference pixels $I_{r0}{}^i$ in the reference affine template 1112. Each pixel $I_t{}^i$ within the current template 1104 can determine its reference pixel $I_{r0}{}^i$ using the affine motion model at that iteration. All the reference pixels $I_{r0}{}^i$ of the pixels $I_t{}^i$ within the current template 1104 form the reference template 1112, in which case the reference affine template 1112 may not be the same shape (e.g., an L-shape) as the current affine template 1104. The pixels $I_t{}^i$ of the current affine template 1104 and the pixels $I_{r0}{}^i$ of the new reference affine template 1112 can then be used to derive new affine motion parameters by performing equation (6).

In one illustrative example, for each iteration, the per-pixel motion vector $(V_x, V_y)$ of each pixel $I_t{}^i$ in the current affine template 1104 points to an associated reference pixel $I_{r0}{}^i$ in the reference affine template 1112 (determined using equations (4) and (5) and the affine motion parameters from a previous iteration). For instance, a pixel $I_t{}^i$ in the current affine template 1104 and an associated reference pixel $I_{r0}{}^i$ in the reference affine template 1112 are referred to herein as a pair of co-located pixels. For each iteration, the pairs of co-located pixels and the corresponding motion vector are related using the equation (4) and (5) along with updated affine parameters from a previous iteration. The updated pairs of co-located pixels (after the new referenced pixels $I_{r0}{}^i$ are found using equations (4) and (5)) can then be used to again solve equation (6). For example, using a pair of co-located pixels (a pixel from the current affine template 1104 and a corresponding pixel from the reference template 1112 located using the affine motion model with the parameters derived in a previous iteration), another set of affine motion parameters (e.g., another set of a, b, c, d parameters) can be derived. Such an iterative process can be performed a certain number of times until a maximum limit (e.g., a maximum of five iterations) is reached, or until all pixels in the current affine template 1104 have been processed. Each iteration of equation (6) results in a different affine motion model having a different set of affine motion parameters (different a, b, c, d values for the current block 1102) that could be used as the affine motion model for the current block 1102.

The best set of affine motion parameters from the iterations that were performed (e.g., the five iterations or other number) can be selected as the affine motion model for the current block 1102. For example, the best set of affine motion parameters can be based on a quality metric. One illustrative example of a quality metric is a sum of absolute difference (SAD). SAD is a measure of the similarity between image blocks, and can be calculated by taking the absolute difference between each pixel in an original block (e.g., the pixels in current affine template 1104) and the corresponding pixel in the block being used for comparison (e.g., the pixels in the reference template 1112). The differences can be summed to create a metric of block similarity. In such an example, the set of affine motion parameters that results in the minimum SAD metric can be selected as the affine motion model for the current block 1102. Any other suitable quality metric can be used, including, but not limited to a sum of absolute transformed difference (SATD), a Mean Square Error (MSE), Mean absolute error (MAE), a mean of absolute differences (MAD), Peak Signals to Noise Ratio (PSNR), among others.

The SAD metric can be defined as:

$$SAD = \sum_{i=0}^{N-1} \sum_{j=0}^{N-1} |C_{ij} - R_{ij}|$$

where $C_{ij}$ and $R_{ij}$ are the pixels (with i, j being the pixel coordinate location) being compared in the current block (e.g., current affine template 1104) and the reference block (reference affine template 1112), respectively, and N is the size of an N×N block.

As shown in FIG. 11B, the control point 1106 is the top left point of the current affine template 1104, and the control point 1108 is the top right point of the current affine template 1104. In some cases, the top left and top right points can be located at points in the current affine template 1104 where pixels are not located (e.g., in a far top left corner and in a far top right corner of the template 1104). In other cases, the top left and top right points can be located at pixel locations of the current affine template 1104 (e.g., a top left pixel and a top right pixel of the template 1104). The set of motion parameters of the affine motion model that is determined to be optimal by the decoding device (e.g., based on a SAD metric) defines the motion vectors $v_0$ and $v_1$ for the control points 1106 and 1108. The motion vectors $v_0$ and $v_1$ of the two control points 1106 and 1108 can then be used to derive the motion of each pixel or of each sub-block within the current block 1102.

FIG. 11C is a diagram illustrating a per-sub-block motion determined based on the motion vectors $v_0$ and $v_1$ of the two control points 1106 and 1108. As shown, the current block 1102 is broken up into a set of 4×4 sub-blocks, with sixteen total sub-blocks (e.g., sub-block 1122). The motion vectors $v_0$ and $v_1$ of the control points 1106 and 1108 of the current affine template 1104 are used to determine the motion of each sub-block in the current block 1102. In one illustrative example, given the motion vectors $v_0$ and $v_1$ of the control points 1106 and 1108, the width (w) of the current block 1102, and the (x, y) position representing a sub-block, equation (1) can be used to determine motion vector (represented by $V_x, V_y$) of the sub-block. In another example, given the known a, b, c, d values of the selected affine motion model and the (x, y) position representing the sub-block, the equations (4) and (5) can be used to determine the motion vector $V_x, V_y$ of the sub-block. In some cases, the (x, y) position in the center of the sub-block, the (x, y) position in a corner of the sub-block, or the (x, y) position at some other location in the sub-block can be used to represent the sub-block in equation (1) or in equations (4) and (5).

The offset of the current block 1102 from the current affine template 1104 (shown as 1120 in FIG. 11A) can be taken into account when determining the (x, y) position coordinates used for the pixels or sub-blocks of the current block 1102. For example, if the current block 1102 is 16 pixels×16 pixels, and the current template 1104 has four pixels in each direction (e.g., four rows of pixels in the top portion of the template and four columns of pixels in the left portion), the top left pixel in the top left sub-block of the current block 1102 can be at a location (4, 4). In such an example, the value of (4, 4) can be used as the (x, y) position in equation (1) or in equations (4) and (5) when determining the motion vector for the first sub-block (in the top left corner) of the current block 1102.

As shown in FIG. 11C, after the affine motion (represented by the control point motion vectors $v_0$ and $v_1$) is derived for the current block 1102 based on the affine template, the affine motion can be mapped to translational motion for each sub-block of the current block 1102 according to the position of each sub-block. For instance, after the motion vector for each sub-block is derived, that motion vector can be considered as a translational motion vector. In one illustrative example, the mapping for a 4-parameter affine model is $V_x = a \cdot x + b \cdot y + c$ and $V_y = b \cdot x - a \cdot y + d$, where x and y indicate the position of a sub-block (in the center or at the corner of the sub-block). The translational motion can be considered to be the same for all pixels within a sub-block.

In some examples, the size of a sub-block and/or the number of sub-blocks in a current block can be predefined. For example, the size of the sub-blocks in the current block 1102 can be pre-defined to be 4 pixels×4 pixels, or another suitable size. In some examples, the size of the sub-blocks and/or the number of sub-blocks in a current block can be signaled or otherwise included in the bitstream (e.g., in the PPS, SPS, VPS, in an SEI message, or the like). In some examples, the size of a sub-block may be adaptively changed based on the size of the current block. In some examples, the size of a sub-block may be the same as that defined in the FRUC mode.

In some implementations, to reduce complexity, only partial sets of the pixels in the current affine template 1104 are used to derive affine motion for a current block. The size (for example, number of rows of top boundary and number of columns of left boundary) of the current affine template can be signaled in the bitstream (e.g., in one or more parameters sets, such as the PPS, SPS, or VPS) or can be predefined. Any predefined number of pixels can be included in the current affine template (and the reference affine template). In one illustrative example, a 4-pixel affine template can be used, in which case for an L-shaped template (e.g., the current affine template 1104), the affine template can include four rows of pixels in the upper portion of the template and four columns of pixels in the left-portion of the template.

In some examples, affine motion vectors can be derived by minimizing the weighted error (or distortion) between the affine prediction and reconstructed pixels of the current affine template of the current block. For example, outliers of affine prediction and reconstructed pixels of the affine template can be removed or multiplied by different weights during derivation. Such outlier removal can improve stability of motion vector derivation. In one illustrative example, the decoding device can derive the affine motion vectors by minimizing the distortion between affine prediction and reconstructed pixels of the current affine template of the current block. Based on the derived motion vectors, the decoding device can calculate the distortion value of each pixel. According to the distortion value, the decoder can assign different weights to the pixels and can then derive motion vectors again by minimizing the weighted distortion between the affine prediction and reconstructed pixels of the affine template of the current block.

In some examples, a filtering process (e.g. a low pass filter, or other suitable filter) may be applied to the current affine template and/or its affine prediction (including the reference affine template) to improve the stability of derivation.

In some examples, for bi-prediction or multi-hypothesis prediction, affine motion may be derived for each hypothesis separately or jointly. In some cases, when deriving affine motion separately, an independent template can be used for each hypothesis. For example, in the case of two hypotheses, two independent templates T0 and T1 can be used. Based on the two templates T0 and T1, MV0 and MV1 can be derived. In some cases, when deriving affine motion jointly, the template may be updated based on an MV that is already derived. For example, in the case of two hypotheses, when deriving the second MV, the template T1 can be updated as T1', such that T1'=(2*T1−Pred(MV0)), where Pred(MV0) represents the prediction with motion MV0. An iterative affine motion derivation may also be allowed in joint derivation.

The template matching based affine motion derivation mode can be signaled (e.g., in the PPS, SPS, VPS, in an SEI message, or the like) as an independent inter-prediction mode with a flag or other syntax item. A syntax item can include a variable, a flag, a syntax element, a syntax structure, or other suitable part of a syntax included in a PPS, a SPS, a VPS, an SEI message, or the like. In some cases, the template matching based affine motion derivation mode may be signaled as special mode of FRUC. In some examples, the template matching based affine motion derivation mode can be signaled and/or used only when the affine template of the current block is available. For example, in some cases, the L-shaped template (or other suitably shaped template) can be considered as available only when both the top and left reconstructed blocks are available. In some cases, when signaled as a special FRUC mode, the binarization illustrated in Table 1 below may be used when all FRUC modes are available for selection:

TABLE 1

| Binarization | |
|---|---|
| 0 | FRUC off |
| 11 | FRUC bilateral matching |
| 101 | FRUC template affine (template matching based affine motion derivation) |
| 100 | FRUC template matching |

In one illustrative example, the context of the third bin (relating to template matching based affine motion derivation) of the above Table 1 may be defined as 0 if none of the above or left neighbors are in an affine mode (AF_MERGE mode, AF_INTER, mode, FRUC_TEMPLATE_AFFINE mode), 1 if either the above or left neighbors is in an affine mode, and 2 if both the above and left neighbors are in an affine mode. The affine mode here includes, but is not limited to, regular affine inter mode, affine merge mode, and template affine (template matching based affine motion derivation).

In some examples, the affine motion ($v_0$ and $v_1$) derived using the techniques described above can be used as the motion vector predictor (MVP) for conventional affine inter-modes (e.g. AF_INTER mode or AF_MERGE mode). For instance, for the conventional affine modes, at least one predictor of affine motion can be derived at the decoder side in the same way as described above. In some cases, a 4-parameter affine model is used to derive affine motion predictor when the block is signaled to use 4-parameter affine model. For example, in affine inter (AF_INTER) mode, a motion vector difference (MVD) can be signaled to the decoding device (e.g., in a PPS, SPS, VPS, SEI message, or the like). The MVD can include a difference between a predictor (e.g., a motion vector of blocks A, B, or C used as a predictor for sub-block 910 in FIG. 9) and a control point motion vector (e.g., the motion vector of the sub-block 910). The MVD can then be added to a motion vector predictor (MVP) by a decoding device to determine the control point motion vectors v0 and v1. The affine template can be used to generate the MVP. For example, the decoding device can derive a, b, c, d using the current affine template and the reference affine template, as described above (e.g., using the optimal set of affine motion parameters). The a, b, c, d motion parameters define the motion vector of the control points v0 and v1. These derived motion vectors can be used as the MVP for sub-blocks 910 and 912. For example, the motion vector $v_0$ can be used as the MVP for sub-block 910, and the motion vector $v_1$ can be used as the MVP for sub-block 912. The MVPs can then added to the corresponding MVD.

In some examples, the affine motion information derivation at the decoder side can be directly performed on the blocks of reconstructed pixels. In one example, after the picture is reconstructed (e.g. after an in-loop filter), the picture is divided into blocks and the template matching based affine motion derivation, as described above, is then applied to each block to derive the affine motion. The derived motion information can then be used for motion vector prediction.

In some examples, to reduce complexity, some coding tools can be constrained when template affine mode is used. Such constraints may be predefined or signaled in bitstreams. In one illustrative example, BIO may not be applied for a block when template matching affine motion derivation is used for the block. In another illustrative example, illumination compensation (IC) may not be applied for a block when template matching based affine motion derivation is used for the block.

FIG. 14 is a flowchart illustrating an example of a process 1400 for deriving one or more sets of affine motion parameters at a decoder using the techniques described herein. At block 1402, the process 1400 includes obtaining, by the decoder, video data from an encoded video bitstream. The video data includes at least a current picture and a reference picture. The current picture includes a picture currently being decoded. In some examples, the reference picture can be identified using a reference picture list or index (e.g., a reference picture list 0 (RefPicList0)). In some cases, multiple reference pictures can be accessed for the current picture, in which case the process 1400 can be performed using more than one reference picture. For example, a reference picture list 0 (RefPicList0) and a reference picture list 1 (RefPicList1) can indicate that two reference pictures are associated with the current picture.

At block 1404, the process 1400 includes determining, by the decoder, a set of affine motion parameters for a current block of the current picture. The set of affine motion parameters are used for performing motion compensation prediction for the current block. The set of affine motion parameters are determined using a current affine template of the current block and a reference affine template of the reference picture. Using the template-based approach, the set of affine parameters can be determined by the decoder using a decoder-side process without using any affine motion signaled in the bitstream. For example, no affine motion parameters are decoded from the encoded video bitstream for determining the set of affine motion parameters. In some cases, affine motion parameters are not included in the bitstream.

In some cases, the process 1400 can determine the set of affine motion parameters by obtaining, by the decoder, an initial set of affine motion parameters. The initial set of affine motion parameters can be determined using any suitable technique. In one illustrative example, the initial set of affine motion parameters can be determined based on a translational motion vector determined for the current block. In some cases, the translational motion vector can be determined using any suitable technique, such as a frame-rate-up-conversion (FRUC) template matching mode or other suitable technique. In another illustrative example, the initial set of affine motion parameters can be determined based on an affine motion vector from a neighboring block of the current block. For instance, the affine motion vector of a neighboring block can be used as the initial motion vector seed for the affine motion derivation of the current block. In one illustrative example, the affine merge (AF_MERGE) mode described above may be used to determine affine motion vector that can be used as the initial motion vector.

The process 1400 can determine the set of affine motion parameters by further deriving, by the decoder, one or more affine motion vectors for one or more pixels in the current affine template of the current block using the initial set of affine motion parameters. The current affine template of the current block includes reconstructed pixels neighboring the current block. An example of the current affine template is shown in FIG. 11A, FIG. 11B, and FIG. 11C. The process 1400 can then determine, by the decoder, one or more pixels in the reference affine template of the reference picture using the one or more affine motion vectors derived for the one or more pixels in the current affine template. The process 1400 can further minimize, by the decoder, an error between at least the one or more pixels in the current affine template and the one or more pixels in the reference affine template determined using the one or more affine motion vectors. The process 1400 can then determine, by the decoder, the set of affine motion parameters for one or more control points of the current affine template based on the minimized error between at least the one or more pixels in the current affine template and the one or more pixels in the reference affine template. Such a process for determining the set of affine motion parameters can be performed, for example, using equations (3)-(6).

In some examples, the process 1400 can determine the set of affine motion parameters for the one or more control points of the current affine template by determining a plurality of sets of affine motion parameters for the one or more control points of the current affine template using at least the one or more pixels in the current affine template and the one or more pixels in the reference affine template determined using the one or more affine motion vectors. For example, equations (4)-(6) can be performed iteratively, as described above, to determine multiple sets of affine motion parameters. The process 1400 can determine a quality metric for each set of affine motion parameters from the plurality of sets of affine motion parameters. In some examples, the quality metric includes a sum of absolute differences (SAD). The process 1400 can then select, for the one or more control points of the current affine template, the set of affine motion parameters from the plurality of sets of affine motion parameters that has a lowest metric from among the plurality of sets of affine motion parameters. As shown in FIG. 11A, FIG. 11B, and FIG. 11C, two control points can be defined for the current block.

The process 1400 can determine motion vectors for one or more samples of the current block based on the set of motion parameters determined for the one or more control points of the current affine template. For example, the process 1400 can determine motion vectors for a plurality of sub-blocks of the current block using the set of affine motion parameters determined for the current block. An example of sub-blocks of a current block are shown in FIG. 11C. In some examples, rather than determining motion vectors for sub-blocks, the process 1400 can determine motion vectors for a plurality of pixels of the current block using the set of affine motion parameters determined for the current block.

In some examples, the current affine template of the current block includes one or more spatially neighboring samples of the current block. In some cases, the spatially neighboring samples include samples from one or more of a top neighboring block or a left neighboring block. For example, the example shown in FIG. 11A includes a current affine template 1104 including samples from a top neighboring block (a neighboring block to the top of the current block) and samples from a left neighboring block (a neighboring block to the left of the current block). In some examples, the current affine template includes an L-shaped block. The L-shaped block can include samples from a top neighboring block of the current block and samples from a left neighboring block of the current block (as shown in FIG. 11A). In other examples, the current affine template can include samples from a right neighboring block and/or a right neighboring block.

FIG. 15 is a flowchart illustrating an example of a process 1500 for encoding video data using the techniques described herein. At block 1502, the process 1500 includes obtaining video data. The video data includes at least a current picture and a reference picture. The current picture includes a picture currently being encoded (or decoded in an inverse loop of the encoder). In some examples, the reference picture can be identified using a reference picture list or index (e.g., a reference picture list 0 (RefPicList0)). In some cases, multiple reference pictures can be used for coding the current picture, in which case the process 1500 can be performed using more than one reference picture. For example, a reference picture list 0 (RefPicList0) and a reference picture list 1 (RefPicList1) can indicate that two reference pictures are associated with the current picture.

At block 1504, the process 1500 includes determining a set of affine motion parameters for a current block of the current picture. The set of affine motion parameters are used for performing motion compensation prediction for the current block. The set of affine motion parameters are determined using a current affine template of the current block and a reference affine template of the reference picture.

At block 1506, the process 1500 includes generating an encoded video bitstream. The encoded video bitstream includes a syntax item indicating template matching based affine motion derivation mode is to be used by a decoder for the current block. The syntax item can include a syntax element, a syntax structure, a variable, a flag, or the like, and can be included in a PPS, an SPS, a VPS, an SEI message, or other part of the encoded video bitstream. The encoded video bitstream does not include any affine motion parameters for determining the set of affine motion parameters. For example, using the template-based approach, the set of affine parameters can be determined by the decoder using a decoder-side process without using any affine motion signaled in the encoded video bitstream. For example, no affine motion parameters are decoded from the encoded video bitstream for determining the set of affine motion parameters.

In some cases, the process 1500 can determine the set of affine motion parameters by obtaining an initial set of affine motion parameters. The initial set of affine motion parameters can be determined using any suitable technique. In one illustrative example, the initial set of affine motion parameters can be determined based on a translational motion vector determined for the current block. In some cases, the translational motion vector can be determined using any suitable technique, such as a frame-rate-up-conversion (FRUC) template matching mode or other suitable technique. In another illustrative example, the initial set of affine motion parameters can be determined based on an affine motion vector from a neighboring block of the current block. For instance, the affine motion vector of a neighboring block can be used as the initial motion vector seed for the affine motion derivation of the current block. In one illustrative example, the affine merge (AF_MERGE) mode described above may be used to determine affine motion vector that can be used as the initial motion vector.

The process 1500 can determine the set of affine motion parameters by further deriving one or more affine motion vectors for one or more pixels in the current affine template of the current block using the initial set of affine motion parameters. The current affine template of the current block includes reconstructed pixels neighboring the current block. An example of the current affine template is shown in FIG. 11A, FIG. 11B, and FIG. 11C. The process 1500 can then determine one or more pixels in the reference affine template of the reference picture using the one or more affine motion vectors derived for the one or more pixels in the current affine template. The process 1500 can further minimize an error between at least the one or more pixels in the current affine template and the one or more pixels in the reference affine template determined using the one or more affine motion vectors. The process 1500 can then determine the set of affine motion parameters for one or more control points of the current affine template based on the minimized error between at least the one or more pixels in the current affine template and the one or more pixels in the reference affine template. Such a process for determining the set of affine motion parameters can be performed, for example, using equations (3)-(6).

In some examples, the process 1500 can determine the set of affine motion parameters for the one or more control points of the current affine template by determining a plurality of sets of affine motion parameters for the one or more control points of the current affine template using at least the one or more pixels in the current affine template and the one or more pixels in the reference affine template determined using the one or more affine motion vectors. For example, equations (4)-(6) can be performed iteratively, as described above, to determine multiple sets of affine motion parameters. The process 1500 can determine a quality metric for each set of affine motion parameters from the plurality of sets of affine motion parameters. In some examples, the quality metric includes a sum of absolute differences (SAD). The process 1500 can then select, for the one or more control points of the current affine template, the set of affine motion parameters from the plurality of sets of affine motion parameters that has a lowest metric from among the plurality of sets of affine motion parameters. As shown in FIG. 11A, FIG. 11B, and FIG. 11C, two control points can be defined for the current block.

The process 1500 can determine motion vectors for one or more samples of the current block based on the set of motion parameters determined for the one or more control points of the current affine template. For example, the process 1500 can determine motion vectors for a plurality of sub-blocks of the current block using the set of affine motion parameters determined for the current block. An example of sub-blocks of a current block are shown in FIG. 11C. In some examples, rather than determining motion vectors for sub-blocks, the process 1500 can determine motion vectors for a plurality of pixels of the current block using the set of affine motion parameters determined for the current block.

In some examples, the current affine template of the current block includes one or more spatially neighboring samples of the current block. In some cases, the spatially neighboring samples include samples from one or more of a top neighboring block or a left neighboring block. For example, the example shown in FIG. 11A includes a current affine template 1104 including samples from a top neighboring block (a neighboring block to the top of the current block) and samples from a left neighboring block (a neighboring block to the left of the current block). In some examples, the current affine template includes an L-shaped block. The L-shaped block can include samples from a top neighboring block of the current block and samples from a left neighboring block of the current block (as shown in FIG. 11A). In other examples, the current affine template can include samples from a right neighboring block and/or a right neighboring block.

In some examples, the process 1500 can store the encoded video bitstream. In some cases, a processor of an encoder performing the process 1500 or an apparatus (e.g., a mobile device, or other suitable device) comprising the encoder can store the encoded video bitstream in a memory of the encoder or in a memory of the apparatus comprising the encoder. In some examples, the process 1500 can transmit the encoded video bitstream.

In some examples, the processes 1400 and 1500 may be performed by a computing device or an apparatus, such as the encoding device 104, the decoding device 112, or any other computing device. For example, the process 1400 can be performed by the decoding device 112, and the process 1500 can be performed by the encoding device 104. In some cases, the computing device or apparatus may include a processor, microprocessor, microcomputer, or other component of a device that is configured to carry out the steps of processes 1400 and 1500. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

Processes 1400 and 1500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1400 and 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 16:
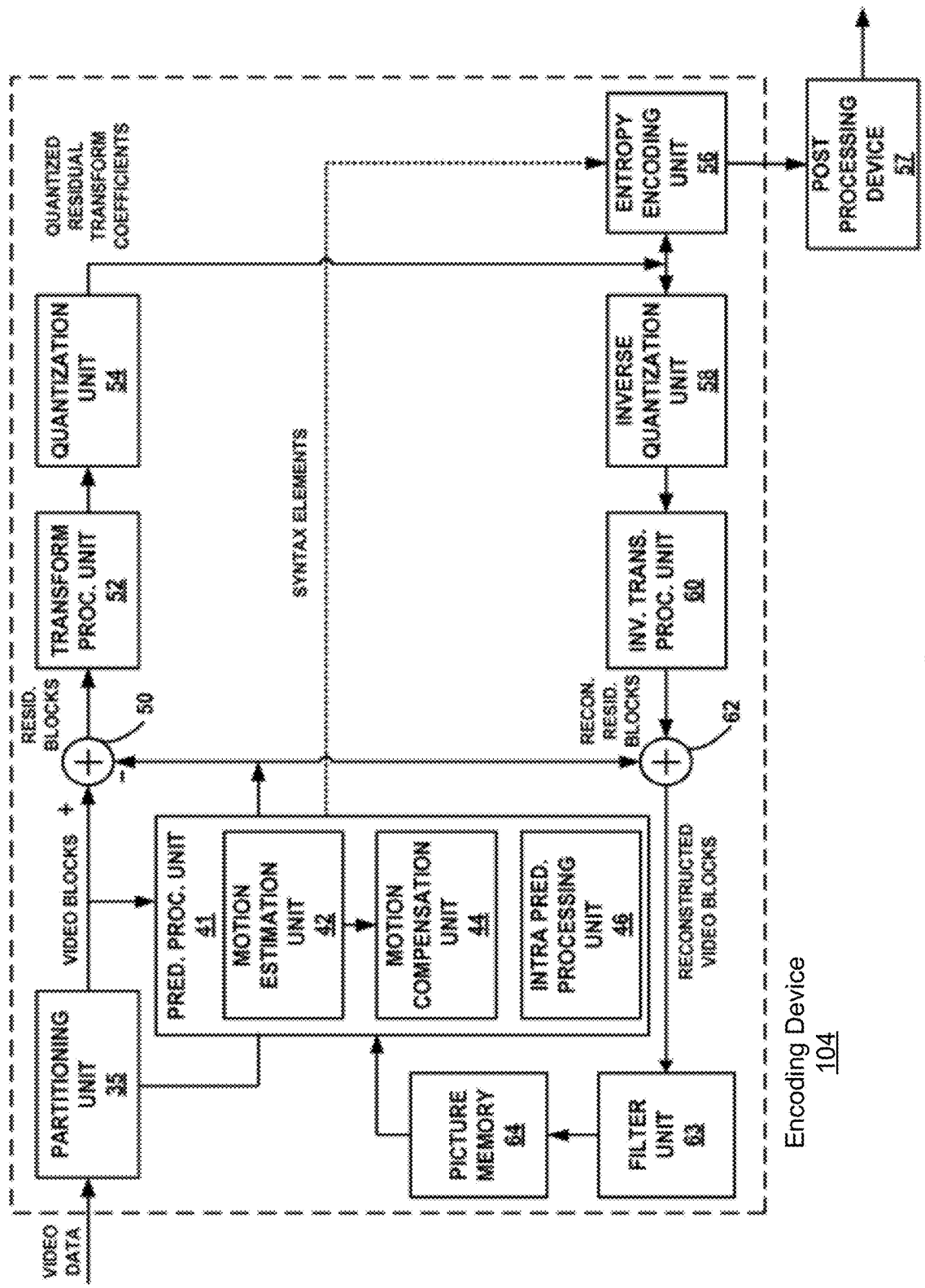
FIG. 16 is a block diagram illustrating an example encoding device, in accordance with some examples.
Figure 17:
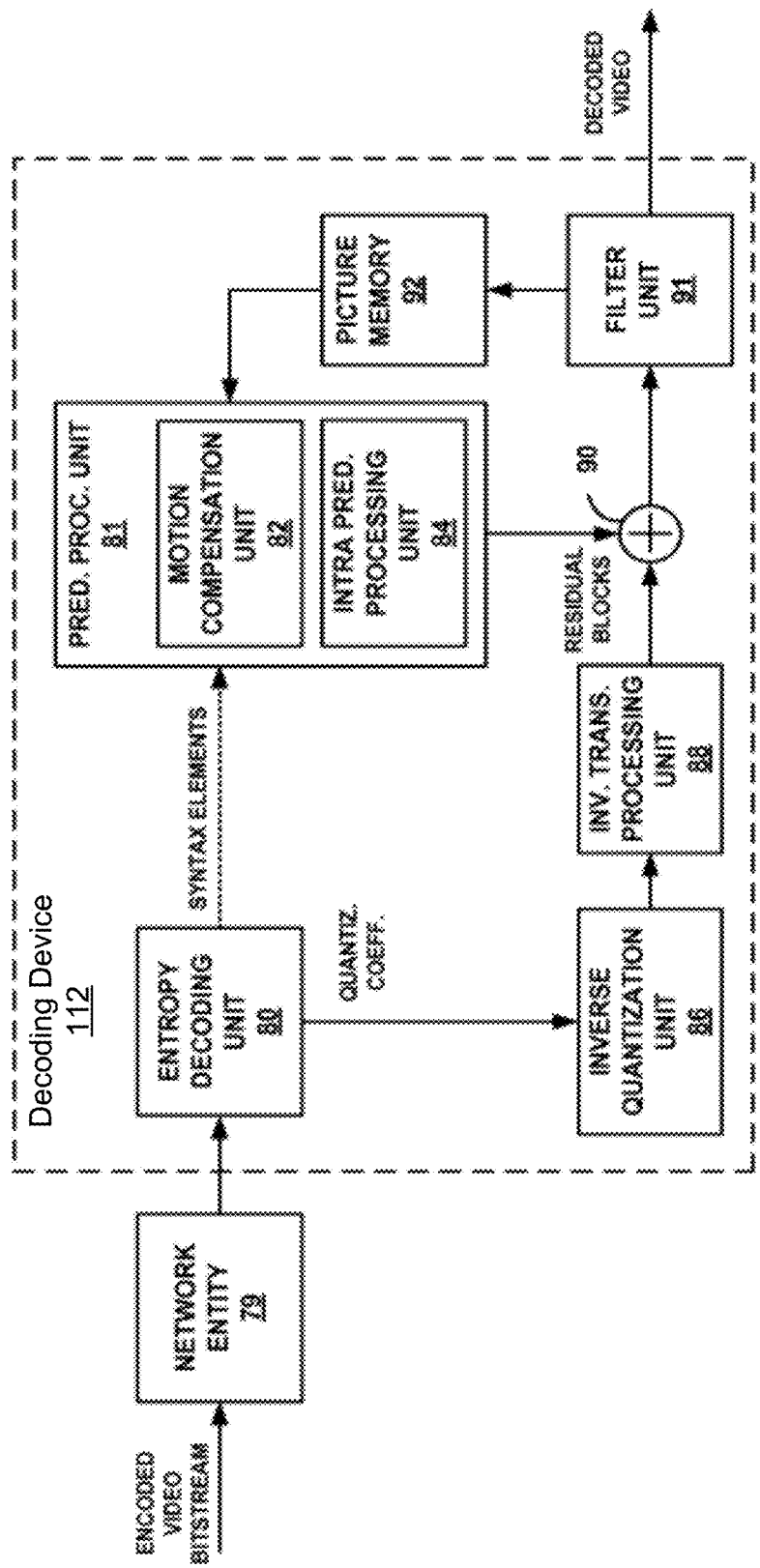
FIG. 17 is a block diagram illustrating an example video decoding device, in accordance with some examples.

Specific details of the encoding device 104 and the decoding device 112 are shown in FIG. 16 and FIG. 17, respectively. FIG. 16 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 16 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 16, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 16 represents an example of a video decoder configured to perform the template matching based affine motion derivation described herein. The encoding device 104 may, for example, determine affine motion parameters, use the affine motion parameters to determine affine motion for one or more blocks of one or more pictures, and generate an encoded video bitstream with a syntax item (e.g., syntax element, syntax structure, variable, flag, or the like) indicating that the template matching based affine motion derivation mode is to be used for the one or more blocks. The encoding device 104 may perform any of the techniques described herein, including the process described above with respect to FIG. 15.

FIG. 17 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 16.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 17 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The decoding device 112 of FIG. 17 represents an example of a video decoder configured to perform the template matching based affine motion derivation described herein. The decoding device 112 may, for example, determine affine motion parameters and use the affine motion parameters to determine affine motion for one or more blocks of one or more pictures. The decoding device 112 may perform any of the techniques described herein, including the process described above with respect to FIG. 14.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of deriving one or more sets of affine motion parameters at a decoder, comprising:
    obtaining, by the decoder, video data from an encoded video bitstream, the video data including at least a current picture and a reference picture;
    determining, by the decoder, a prediction mode for a current block is an affine mode based on a syntax item associated with the encoded video bitstream;
    determining, based on the determined prediction mode being the affine mode, to locally derive affine motion parameters for the current block by the decoder;
    obtaining, by the decoder, an initial motion vector;
    determining, by the decoder using the initial motion vector, a first set of affine motion parameters for the current block;
    determining, by the decoder, one or more affine motion vectors for one or more samples in a current affine template of the current block using the first set of affine motion parameters, the current affine template including reconstructed samples neighboring the current block;
    determining, by the decoder, one or more samples in a reference affine template of the reference picture using the one or more affine motion vectors determined for the one or more samples in the current affine template, the reference affine template including reconstructed samples neighboring a reference block of the reference picture;
    determining, by the decoder, a second set of affine motion parameters for the current block using the one or more samples in the current affine template and the one or more samples in the reference affine template; and
    determining motion vectors for a plurality of samples of the current block using the second set of affine motion parameters.

2. The method of claim 1, wherein determining the motion vectors for the plurality of samples of the current block includes:
    determining motion vectors for a plurality of sub-blocks of the current block.

3. The method of claim 1, further comprising:
    determining, by the decoder, a difference between at least the one or more samples in the current affine template and the one or more samples in the reference affine template determined using the one or more affine motion vectors; and
    determining, by the decoder, the second set of affine motion parameters for one or more control points of the current affine template based on the determined difference between at least the one or more samples in the current affine template and the one or more samples in the reference affine template.

4. The method of claim 3, wherein determining the second set of affine motion parameters for the one or more control points of the current affine template includes:
    determining a plurality of sets of affine motion parameters for the one or more control points of the current affine template using at least one sample in the current affine template and at least one sample in one or more reference affine templates;
    determining a quality metric for each set of affine motion parameters from the plurality of sets of affine motion parameters; and
    selecting, for the one or more control points of the current affine template, the second set of affine motion parameters from the plurality of sets of affine motion parameters based on the second set of affine motion parameters having a lowest metric from among the plurality of sets of affine motion parameters.

5. The method of claim 4, wherein the quality metric includes a sum of absolute differences (SAD).

6. The method of claim 1, wherein the first set of affine motion parameters is determined based on a translational motion vector determined for the current block.

7. The method of claim 6, wherein the translational motion vector is determined using frame-rate-up-conversion (FRUC) template matching.

8. The method of claim 1, wherein the first set of affine motion parameters is determined based on an affine motion vector from a neighboring block of the current block.

9. The method of claim 1, wherein the second set of affine motion parameters is determined for the current block without decoding any affine motion parameters for the current block from the encoded video bitstream.

10. The method of claim 1, wherein the current affine template is an L-shaped block including a row of reconstructed samples from a first neighboring block of the current block and a column of reconstructed samples from a second neighboring block of the current block, wherein the first neighboring block of the current block is a top neighboring block, and wherein the second neighboring block of the current block is a left neighboring block.

11. A decoder for deriving one or more sets of affine motion parameters, comprising:
    a memory configured to store video data of an encoded video bitstream; and a processor configured to:
  obtain the video data of the encoded video bitstream, the video data including at least a current picture and a reference picture;
  determine a prediction mode for a current block is an affine mode based on a syntax item associated with the encoded video bitstream;
  determine, based on the determined prediction mode being the affine mode, to locally derive affine motion parameters for the current block by the decoder;
  obtain an initial motion vector;
  determine, using the initial motion vector, a first set of affine motion parameters for the current block;
  determine one or more affine motion vectors for one or more samples in a current affine template of the current block using the first set of affine motion parameters, the current affine template including reconstructed samples neighboring the current block;
  determine one or more samples in a reference affine template of the reference picture using the one or more affine motion vectors determined for the one or more samples in the current affine template, the reference affine template including reconstructed samples neighboring a reference block of the reference picture;
  determine a second set of affine motion parameters for the current block using the one or more samples in the current affine template and the one or more samples in the reference affine template; and
  determine motion vectors for a plurality of samples of the current block using the second set of affine motion parameters.

12. The decoder of claim 11, wherein determining the motion vectors for the plurality of samples of the current block includes:
  determining motion vectors for a plurality of sub-blocks of the current block.

13. The decoder of claim 11, wherein the processor is configured to:
  determine a difference between at least the one or more samples in the current affine template and the one or more samples in the reference affine template determined using the one or more affine motion vectors; and
  determine the second set of affine motion parameters for one or more control points of the current affine template based on the determined difference between at least the one or more samples in the current affine template and the one or more samples in the reference affine template.

14. The decoder of claim 13, wherein determining the second set of affine motion parameters for the one or more control points of the current affine template includes:
  a plurality of sets of affine motion parameters for the one or more control points of the current affine template using at least one sample in the current affine template and at least one sample in one or more reference affine templates;
  determining a quality metric for each set of affine motion parameters from the plurality of sets of affine motion parameters; and
  selecting, for the one or more control points of the current affine template, the second set of affine motion parameters from the plurality of sets of affine motion parameters based on the second set of affine motion parameters having a lowest metric from among the plurality of sets of affine motion parameters.

15. The decoder of claim 14, wherein the quality metric includes a sum of absolute differences (SAD).

16. The decoder of claim 11, wherein the first set of affine motion parameters is determined based on a translational motion vector determined for the current block.

17. The decoder of claim 16, wherein the translational motion vector is determined using frame-rate-up-conversion (FRUC) template matching.

18. The decoder of claim 11, wherein the first set of affine motion parameters is determined based on an affine motion vector from a neighboring block of the current block.

19. The decoder of claim 11, wherein the second set of affine motion parameters is determined for the current block without decoding any affine motion parameters for the current block from the encoded video bitstream.

20. The decoder of claim 11, wherein the current affine template is an L-shaped block including a row of reconstructed samples from a first neighboring block of the current block and a column of reconstructed samples from a second neighboring block of the current block, wherein the first neighboring block of the current block is a top neighboring block, and wherein the second neighboring block of the current block is a left neighboring block.

21. The decoder of claim 11, wherein the decoder is part of a mobile device with a display for displaying decoded video data.

22. The decoder of claim 11, wherein the decoder is part of a mobile device with a camera for capturing pictures.

23. A method of encoding video data, comprising:
  obtaining video data, the video data including at least a current picture and a reference picture;
  obtaining an initial motion vector;
  determining, using the initial motion vector, a first set of affine motion parameters for a current block of the current picture;
  determining one or more affine motion vectors for one or more samples in a current affine template of the current block using the first set of affine motion parameters, the current affine template including reconstructed samples neighboring the current block;
  determining one or more samples in a reference affine template of the reference picture using the one or more affine motion vectors determined for the one or more samples in the current affine template, the reference affine template including reconstructed samples neighboring a reference block of the reference picture;
  determining a second set of affine motion parameters for the current block using the one or more samples in the current affine template and the one or more samples in the reference affine template; and
  generating an encoded video bitstream, the encoded video bitstream including a syntax item indicating template matching based affine motion derivation mode is to be used by a decoder for the current block, wherein the encoded video bitstream does not include any affine motion parameters for determining the set of affine motion parameters.

24. The method of claim 23, further comprising:
  determining motion vectors for a plurality of sub-blocks of the current block using the second set of affine motion parameters determined for the current block.

25. The method of claim 23, further comprising:
  determining motion vectors for a plurality of samples of the current block using the second set of affine motion parameters determined for the current block.

26. The method of claim 23, further comprising:
- determining a difference between at least the one or more samples in the current affine template and the one or more samples in the reference affine template determined using the one or more affine motion vectors; and
- determining the set of affine motion parameters for one or more control points of the current affine template based on the determined difference between at least the one or more samples in the current affine template and the one or more samples in the reference affine template.

27. The method of claim 26, wherein determining the second set of affine motion parameters for the one or more control points of the current affine template includes:
- determining a plurality of sets of affine motion parameters for the one or more control points of the current affine template using at least one sample in the current affine template and at least one sample in one or more reference affine templates;
- determining a quality metric for each set of affine motion parameters from the plurality of sets of affine motion parameters; and
- selecting, for the one or more control points of the current affine template, the second set of affine motion parameters from the plurality of sets of affine motion parameters based on the second set of affine motion parameters having a lowest metric from among the plurality of sets of affine motion parameters.

28. The method of claim 27, wherein the quality metric includes a sum of absolute differences (SAD).

29. The method of claim 23, wherein the first set of affine motion parameters is determined based on a translational motion vector determined for the current block.

30. The method of claim 29, wherein the translational motion vector is determined using frame-rate-up-conversion (FRUC) template matching.

31. The method of claim 23, wherein the first set of affine motion parameters is determined based on an affine motion vector from a neighboring block of the current block.

32. The method of claim 23, wherein the current affine template is an L-shaped block including a row of reconstructed samples from a first neighboring block of the current block and a column of reconstructed samples from a second neighboring block of the current block, wherein the first neighboring block of the current block is a top neighboring block, and wherein the second neighboring block of the current block is a left neighboring block.

33. The method of claim 23, further comprising storing the encoded video bitstream.

34. The method of claim 23, further comprising transmitting the encoded video bitstream.

35. An encoder for encoding video data, comprising:
a memory configured to store video data; and
a processor configured to:
- obtain the video data, the video data including at least a current picture and a reference picture;
- obtain an initial motion vector;
- determine, using the initial motion vector, a first set of affine motion parameters for a current block of the current picture;
- determine one or more affine motion vectors for one or more samples in a current affine template of the current block using the first set of affine motion parameters, the current affine template including reconstructed samples neighboring the current block;
- determine one or more samples in a reference affine template of the reference picture using the one or more affine motion vectors determined for the one or more samples in the current affine template, the reference affine template including reconstructed samples neighboring a reference block of the reference picture;
- determine a second set of affine motion parameters for the current block using the one or more samples in the current affine template and the one or more samples in the reference affine template; and
- generate an encoded video bitstream, the encoded video bitstream including a syntax item indicating template matching based affine motion derivation mode is to be used by a decoder for the current block, wherein the encoded video bitstream does not include any affine motion parameters for determining the set of affine motion parameters.

36. The encoder of claim 35, wherein the processor is further configured to:
- determine motion vectors for a plurality of sub-blocks of the current block using the second set of affine motion parameters determined for the current block.

37. The encoder of claim 35, wherein the processor is further configured to:
- determine motion vectors for a plurality of samples of the current block using the second set of affine motion parameters determined for the current block.

38. The encoder of claim 35, wherein the processor is further configured to:
- determining a difference between at least the one or more samples in the current affine template and the one or more samples in the reference affine template determined using the one or more affine motion vectors; and
- determining the set of affine motion parameters for one or more control points of the current affine template based on the determined difference between at least the one or more samples in the current affine template and the one or more samples in the reference affine template.

39. The encoder of claim 38, wherein determining the second set of affine motion parameters for the one or more control points of the current affine template includes:
- determining a plurality of sets of affine motion parameters for the one or more control points of the current affine template using at least one sample in the current affine template and at least one sample in one or more reference affine templates;
- determining a quality metric for each set of affine motion parameters from the plurality of sets of affine motion parameters; and
- selecting, for the one or more control points of the current affine template, the second set of affine motion parameters from the plurality of sets of affine motion parameters based on the second set of affine motion parameters having a lowest metric from among the plurality of sets of affine motion parameters.

40. The encoder of claim 39, wherein the quality metric includes a sum of absolute differences (SAD).

41. The encoder of claim 35, wherein the first set of affine motion parameters is determined based on a translational motion vector determined for the current block.

42. The encoder of claim 41, wherein the translational motion vector is determined using frame-rate-up-conversion (FRUC) template matching.

43. The encoder of claim 38, wherein the first set of affine motion parameters is determined based on an affine motion vector from a neighboring block of the current block.

44. The encoder of claim 35, wherein the current affine template is an L-shaped block including a row of reconstructed samples from a first neighboring block of the current block and a column of reconstructed samples from a second neighboring block of the current block, wherein the first neighboring block of the current block is a top neighboring block, and wherein the second neighboring block of the current block is a left neighboring block.

45. The encoder of claim 35, wherein the processor is configured to store the encoded video bitstream in the memory.

46. The encoder of claim 35, further comprising a transmitter configured to transmit the encoded video bitstream.

47. The encoder of claim 35, wherein the encoder is part of a mobile device with a display for displaying decoded video data.

48. The encoder of claim 35, wherein the encoder is part of a mobile device with a camera for capturing pictures.

* * * * *